United States Patent
Uchida et al.

(10) Patent No.: US 7,568,969 B2
(45) Date of Patent: Aug. 4, 2009

(54) LOCKING MECHANISM OF LINEAR MOTOR TRAVEL SLIDER AND PROCESSING MACHINE

(75) Inventors: Hiroyuki Uchida, Toyama (JP); Sadatsune Ammi, Toyama (JP)

(73) Assignee: Nippei Toyama Corporation, Tokyo (JP)

( * ) Notice: Subject to any disclaimer, the term of this patent is extended or adjusted under 35 U.S.C. 154(b) by 625 days.

(21) Appl. No.: 10/969,952

(22) Filed: Oct. 22, 2004

(65) Prior Publication Data

US 2007/0054598 A1 Mar. 8, 2007

(30) Foreign Application Priority Data

| Oct. 22, 2003 | (JP) | ............................ P.2003-362375 |
| Nov. 14, 2003 | (JP) | ............................ P.2003-385562 |
| Sep. 17, 2004 | (JP) | ............................ P.2004-272431 |
| Sep. 17, 2004 | (JP) | ............................ P.2004-272432 |

(51) Int. Cl.
*B24B 49/00* (2006.01)

(52) U.S. Cl. ............................ 451/11; 451/246; 70/283; 70/278.7

(58) Field of Classification Search ............. 451/5, 451/10, 11, 242, 246, 251; 70/283, 278.7, 70/287
See application file for complete search history.

(56) References Cited

U.S. PATENT DOCUMENTS

| 3,882,333 | A | * | 5/1975 | DeWeese .................... 310/14 |
| 4,570,387 | A | * | 2/1986 | Unno et al. .................. 451/5 |
| 5,092,417 | A | * | 3/1992 | Oslapas ..................... 180/446 |
| 6,009,981 | A | * | 1/2000 | Wolfe ......................... 188/267 |
| 2003/0032376 | A1 | * | 2/2003 | Ikeda ......................... 451/242 |

| 2005/0092046 | A1 | * | 5/2005 | Errani et al. ................. 70/283 |

FOREIGN PATENT DOCUMENTS

| JP | 47-15265 | | 12/1899 |
| JP | 59-53686 | U | 4/1984 |
| JP | 63-221959 | A | 9/1988 |
| JP | 3-221363 | A | 9/1991 |
| JP | 8-272418 | A | 10/1996 |

(Continued)

OTHER PUBLICATIONS

Japanese Office Action dated Mar. 5, 2008.

(Continued)

*Primary Examiner*—Eileen P. Morgan
(74) *Attorney, Agent, or Firm*—Sughrue Mion, PLLC

(57) ABSTRACT

A locking mechanism of a linear motor travel slider, includes: a serration member having a teeth portion and disposed on one of the bed and the travel slider extending in a slider-traveling-direction; a bracket supported by the other of the bed and the travel slider; an actuator supported by the other of the bed and the travel slider; a locking member supported by the actuator having a teeth portion engageable with the teeth portion of the serration member; and a controller for controlling the actuator to retain the lock member in an unlocked position when the linear motor is energized and for stopping the actuator when the linear motor is in a stop state due to a power failure. The locking member includes an urging member for making the locking member engage with the serration member while the actuator is in a stop state.

12 Claims, 17 Drawing Sheets

FOREIGN PATENT DOCUMENTS

| | | |
|---|---|---|
| JP | 10-112971 A | 4/1998 |
| JP | 2000-184686 A | 6/2000 |
| JP | 2001-136726 A | 5/2001 |
| JP | 2002-182714 A | 6/2002 |
| JP | 2002-239901 A | 8/2002 |
| JP | 2002-283205 A | 10/2002 |

OTHER PUBLICATIONS

Japanese Office Action dated Oct. 7, 2008.

* cited by examiner

LOCKING MECHANISM OF LINEAR MOTOR TRAVEL SLIDER AND PROCESSING MACHINE

BACKGROUND OF THE INVENTION

1. Field of the Invention

The present invention relates to a locking mechanism of a linear motor travel slider used in a processing machine, such as machine tools or industrial machinery, and to a processing machine having the same. More specifically, the invention relates to a locking mechanism capable of surely locking the travel slider in a stop state of a linear motor during a power failure, and a processing machine having the same.

2. Background Art

Generally, a grinding machine is constructed so that a grinding wheel stock is mounted on a bed reciprocably in a backward and forward direction and a grinding wheel mounted in the grinding wheel stock is reciprocated in the backward and forward direction toward a rotating workpiece supported in a main spindle stock and a tailstock. A linear motor is used as a driving source for driving the grinding wheel stock in the backward and forward direction. This linear motor can be suddenly stopped or suddenly decelerated electrically without using a mechanical brake under control of a controller. In case that an accident such as a power failure or a break in wire occurs during an action of the linear motor and a signal for controlling the linear motor disappears, there is a possibility that an operation by the controller is disabled and the grinding wheel stock coasts.

In order to solve the problem described above, a mechanical brake mechanism of a linear motor travel shaft disclosed in JP-A-10-112971 is proposed. In this brake mechanism, a suction plate is sucked and held in a lower surface of a travel slider through an electromagnet for suction plate holding. A coil spring is interposed between the travel slider and the suction plate, and an air cylinder mechanism is mounted between the travel slider and the suction plate. Further, in an upper surface of a machine stock frame, a fixed magnet is arranged in correspondence with the suction plate and a friction member 5 is attached to a lower surface of the suction plate and an external friction engagement member is laid on the upper surface of the machine stock frame corresponding to this friction member so as to extend in a travel direction of the travel slider.

Then, when the linear motor is energized, the air cylinder upward lifts the suction plate against energization force of the coil spring and the brake mechanism is released. In a state of a power failure, the air cylinder mechanism is stopped and the friction member is pressed on the external friction engagement member by an urging force of the coil spring and braking force is given to the travel slider in travel and coasting of the travel slider is blocked.

SUMMARY OF THE INVENTION

However, in the mechanical brake mechanism of the related art described above, there was a problem that in the case of using a grinding machine, a surface of the friction member is stained with cutting material included in a coolant or iron powder occurring from a workpiece during grinding work and force of friction between the external friction engagement member and the friction member decreases and it is difficult to surely hold the travel slider in a stop position. Also, since the friction member involves wear and increases force pressed on the external friction engagement member, an elastic coefficient of the coil spring must be increased and as a result of this, there was also a problem that the air cylinder mechanism cannot be miniaturized.

An object of invention is to solve the problems lying in the related art, and to provide a locking mechanism of a linear motor type travel slider and a processing mechanism having the same, in which, when a linear motor is in a stopped state during a power failure, a travel slider can surely be held in a stop position and also an actuator can be miniaturized by reducing an elastic coefficient of an urging member.

To achieve the object, the invention provides a locking mechanism of a linear motor travel slider, wherein the travel slider is reciprocably supported on an upper surface of a bed by a linear motor, and movement of the travel slider is stopped at the time of a power failure. The locking mechanism includes: a serration member laid on one of the bed and the travel slider in a direction that the travel slider travels, the serration member having a teeth portion; a bracket supported by the other of the bed and the travel slider; an actuator supported by the other of the bed and the travel slider through the bracket; a locking member having a teeth portion engageable with the teeth portion of the serration member, the locking member supported with respect to the actuator; and a controller that actuates the actuator so as to retain the lock member in an unlocked position when the linear motor is energized, and that stops an actuation of the actuator when the linear motor is in a stop state due to a power failure. The locking member includes an urging member for making the locking member engage with the serration member while the actuation of the actuator is in a stop state.

Preferably, the serration member is disposed on a side portion of the bed; the bracket is disposed on a side portion of the travel slider; the actuator includes a cylinder that is supported by the bracket, the cylinder having a piston rod that supports the locking member; and the urging member includes a spring that is interposed between the locking member and the bracket.

Preferably, the locking mechanism of a linear motor travel slider further includes: a cover for protecting the serration member at an upper portion thereof, the cover provided one of the side portion of the travel slider and the side portion of the bed.

Preferably, the locking mechanism of a linear motor travel slider further includes: a holder attached to a tip end portion of the piston rod; wherein the locking member is attached to the tip end portion of the piston rod through the holder; the bracket has a rotation blocking plate; and the holder has a flat side that is in slidable contact with the rotation blocking plate so that a rotation of the locking member is prevented.

Preferably, the locking member is formed in a cylindrical shape having a closed bottom and a top surface, the top surface including two portions where the teeth portion of the locking member is formed; the piston rod is inserted into a through hole that is formed in the closed bottom so that the locking member is movable toward an unlocked position against an urging force of the urging member; and the bracket has a receiving tubular part into which the locking member is slidably fitted in a whirl stop state.

Preferably, the serration member is provided in correspondence with the whole region of a movement stroke of the travel slider.

Preferably, a workpiece support mechanism for supporting a workpiece is mounted in a state opposed to the travel slider; a processing tool for processing the workpiece is mounted on the travel slider; a power failure detection unit is connected to the controller; and the controller includes: a workpiece processing determination unit that determines whether the workpiece is in processing in a state in which a power failure is detected, a travel slider retraction stop unit that retracts the travel slider and separates the processing tool from the workpiece to make a stop when the workpiece is determined to be in processing, a travel slider deceleration stop unit that decelerates and stops the travel slider when the workpiece is not determined to be in processing, and an actuator actuation stop unit that stops actuation of the actuator when the travel slider is moved in a stop position.

Preferably, a processing machine stop instruction unit that stops a processing action of a processing machine is connected to the controller; and the workpiece processing determination unit is actuated in a state in which the processing action of the processing machine is stopped.

The invention provides a processing machine, including: a bed having an upper surface; a travel slider; a linear motor that reciprocably supports the travel slider on the upper surface of the bed; and a locking mechanism that stops a movement of the travel slider at the time of a power failure; wherein the locking mechanism includes: a serration member laid on one of the bed and the travel slider in a direction that the travel slider travels, the serration member having a teeth portion, a bracket supported by the other of the bed and the travel slider, an actuator supported by the other of the bed and the travel slider through the bracket, a locking member having a teeth portion engageable with the teeth portion of the serration member, the locking member supported with respect to the actuator, and a controller that actuates the actuator so as to retain the lock member in an unlocked position when the linear motor is energized, and that stops an actuation of the actuator when the linear motor is in a stop state due to a power failure; and the locking member includes an urging member for making the locking member engage with the serration member while the actuation of the actuator is in a stop state.

Preferably, the serration member is disposed on a side portion of the bed; the bracket is disposed on a side portion of the travel slider; the actuator includes a cylinder that is supported by the bracket, the cylinder having a piston rod that supports the locking member; and the urging member includes a spring that is interposed between the locking member and the bracket.

Preferably, the locking mechanism further includes a cover for protecting the serration member at an upper portion thereof; and the cover is provided one of the side portion of the travel slider and the side portion of the bed.

Preferably, the locking mechanism further includes: a holder attached to a tip end portion of the piston rod; the locking member is attached to the tip end portion of the piston rod through the holder; the bracket has a rotation blocking plate; and the holder has a flat side that is in slidable contact with the rotation blocking plate so that a rotation of the locking member is prevented.

Preferably, the locking member is formed in a cylindrical shape having a closed bottom and a top surface, the top surface including two portions where the teeth portion of the locking member is formed; the piston rod is inserted into a through hole that is formed in the closed bottom so that the locking member is movable toward an unlocked position against an urging force of the urging member; and the bracket has a receiving tubular part into which the locking member is slidably fitted in a whirl stop state.

Preferably, the serration member is provided in correspondence with the whole region of a movement stroke of the travel slider.

Preferably, the processing machine, further includes: a workpiece support mechanism for supporting a workpiece, mounted in a state opposed to the travel slider; a processing tool for processing the workpiece, mounted on the travel slider; and a power failure detection unit connected to the controller; wherein the controller includes: a workpiece processing determination unit that determines whether the workpiece is in processing in a state in which a power failure is detected, a travel slider retraction stop unit that retracts the travel slider and separates the processing tool from the workpiece to make a stop when the workpiece is determined to be in processing, a travel slider deceleration stop unit that decelerates and stops the travel slider when the workpiece is not determined to be in processing, and an actuator actuation stop unit that stops actuation of the actuator when the travel slider is moved in a stop position.

Preferably, the processing machine further includes: a processing machine stop instruction unit that stops a processing action of the processing machine, the processing machine stop unit connected to the controller; wherein the workpiece processing determination unit is actuated in a state in which the processing action of the processing machine is stopped.

Preferably, the processing machine includes a grinding machine; and the grinding machine includes: a main spindle stock having a clamping mechanism for clamping an end of a workpiece and a main spindle for rotating the workpiece, a grinding wheel stock having a grindstone for grinding a ground part of the workpiece while being in contact with an outer circumference surface of the ground part, a main spindle rotational angle detection unit that detects a rotational angle of the main spindle, a position detection unit that detects a position in a forward and backward direction of the grinding wheel stock, and a controller that outputs a control signal for controlling a rotation of the main spindle and the grindstone and a position of the grinding wheel stock, based on a detection signal from the spindle rotational angle detection unit and the position detection unit.

Preferably, the controller includes: a first storage that stores imperfect circular rotating body grinding data for grinding an outer circumference surface of a rotating imperfect circular body of the workpiece, a second storage that stores perfect circular revolving body grinding data for grinding an outer circumference surface of a revolving perfect circular body of the workpiece, a third storage that stores perfect circular rotating body grinding data for grinding an outer circumference surface of a perfect circular body rotating at a center portion of the workpiece, and a grinding data selection unit that selects the grinding data from one of the first, second and third storages according to the workpiece to be ground.

Preferably, the workpiece includes a camshaft having a cam part; the first storage stores a profile data for grinding the cam shaft that is preset based on lift data representing a final finish shape of an outer circumference surface of the cam part acting as the imperfect circular body; and control of a position of the grinding wheel stock and rotation of the cam shaft is performed based on the profile data so as to grind the cam part.

Preferably, the revolving perfect circular body of the workpiece is a pin part of a crankshaft; the second storage stores a computing equation for computing grinding wheel stock control data (DX) on the straight line between a center (O) of revolution of the pin part and a center (P) of rotation of the grindstone; the computing equation includes: a revolution radius (L) representing a distance between the center (O) of revolution and a center (Op) of the pin part, a radius (Rp) of the pin part, the center (P) of rotation of the grindstone, a radius of the grindstone (Rg), a revolution angle (θ) of the center (Op) of the pin part with respect to a straight line passing the center (O) of revolution and the center (P) of rotation, and a distance (Rgp=Rg+Rp) between the center (P) of rotation of the grindstone and the center (Op) of the pin part; and a grinding wheel stock control position is obtained in accordance with the computing equation so as to grind the pin part.

Preferably, the computing equation is as follows:

$$DX = L \cdot \cos\theta + \sqrt{(Rgp)^2 - L^2 \cdot \sin^2\theta}$$

Preferably, the perfect circular body rotating at the center of the workpiece is one of a camshaft, a journal portion of a crankshaft, a cylinder hollow workpiece and a cylinder solid workpiece.

According to the invention, a travel slider is locked in a stop position in a state in which a locking member having teeth is engaged with a serration member having teeth, so that the stop position of the travel slider can surely be held. Also, an elastic coefficient of an urging member for holding a locking member in a locked position can be decreased and therefore, capacity of an actuator can be reduced.

BRIEF DESCRIPTION OF THE DRAWINGS

The present invention may be more readily described with reference to the accompanying drawings.

DETAILED DESCRIPTION OF THE PREFERRED EMBODIMENTS

Figure 4:
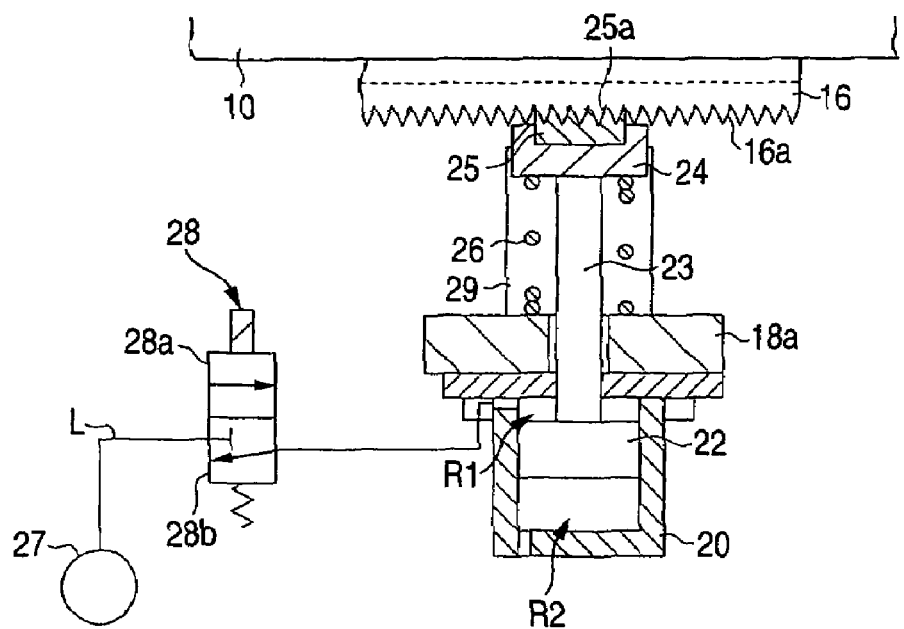
FIG. 4 is an enlarged sectional plan view of a locked state of the locking mechanism.
Figure 5:
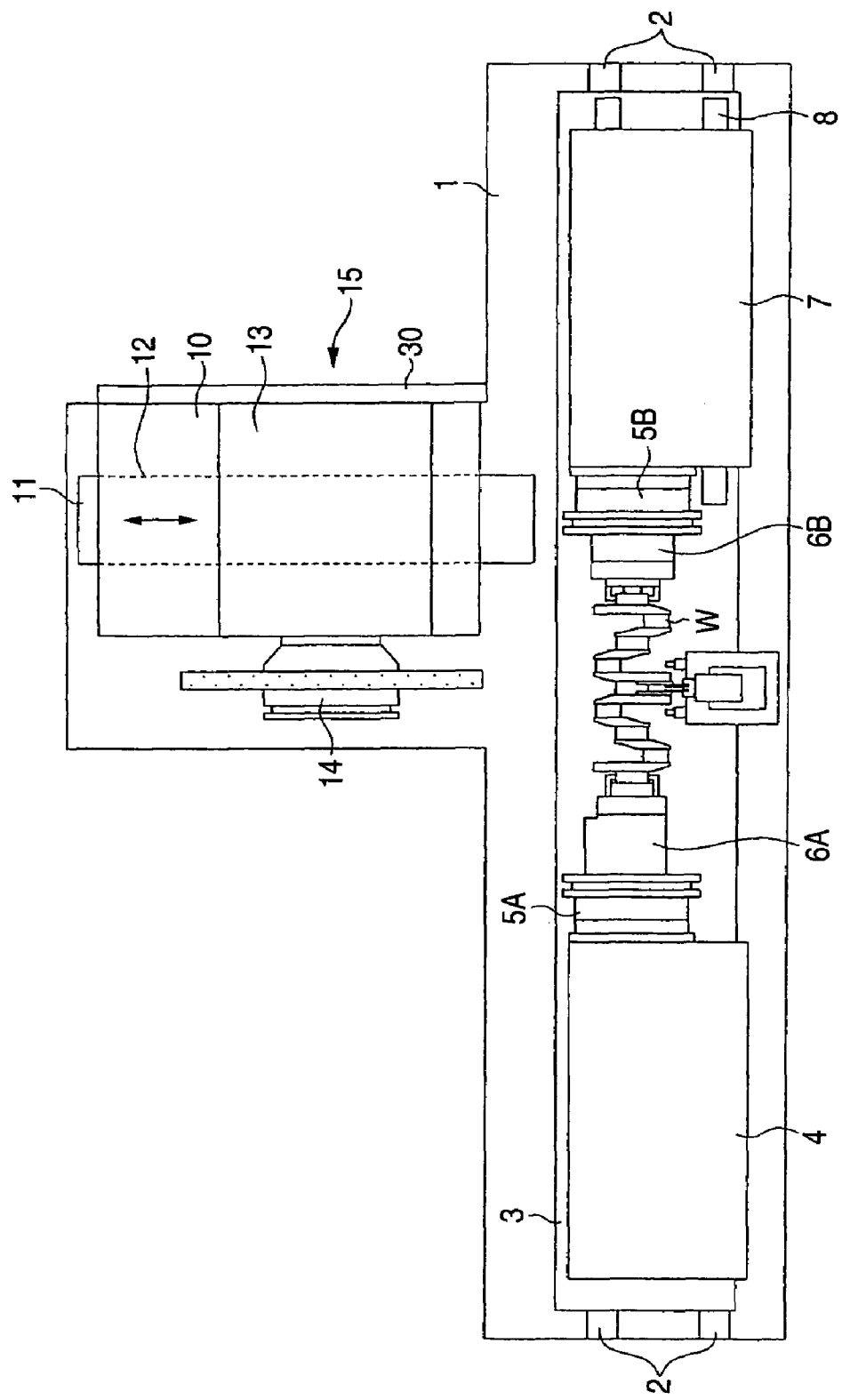
FIG. 5 is a whole planar view showing the grind wheel stock.

One embodiment will be described below in accordance with FIGS. 1-7, in which a processing machine having a locking mechanism of a linear motor travel slider of the invention is embodied in a grinding machine As shown in FIG. 5, a movement table 3 is supported movably in a right and left direction through guide rails 2 on an upper surface of a bed 1. A main spindle stock 4 for rotatably supporting one main spindle 5A is fixed and arranged on an upper surface of one side of the movement table 3, and a main spindle stock 7 for rotatably supporting the other main spindle 5B is supported movably with respect to the movement table 3 through guide rails 8 on an upper surface of the other side. It is constructed so that chucks 6A, 6B are respectively disposed in the opposed ends of both the main spindle stocks 4, 7 through an indexing device and both ends of a workpiece W such as a crank shaft or a cam shaft are detachably grasped.

In this embodiment, a workpiece support mechanism comprises the movement table 3, the main spindle stocks 4, 7, the main spindles 5A, 5B, the chucks 6A, 6B and the guide rails 8, etc.

In FIG. 5, a grinding wheel stock 10 acting as a travel slider is mounted reciprocably in a backward and forward direction (arrow direction of FIG. 5) on the upper surface of the bed 1 jutted to the back (upper side).

Figure 1:
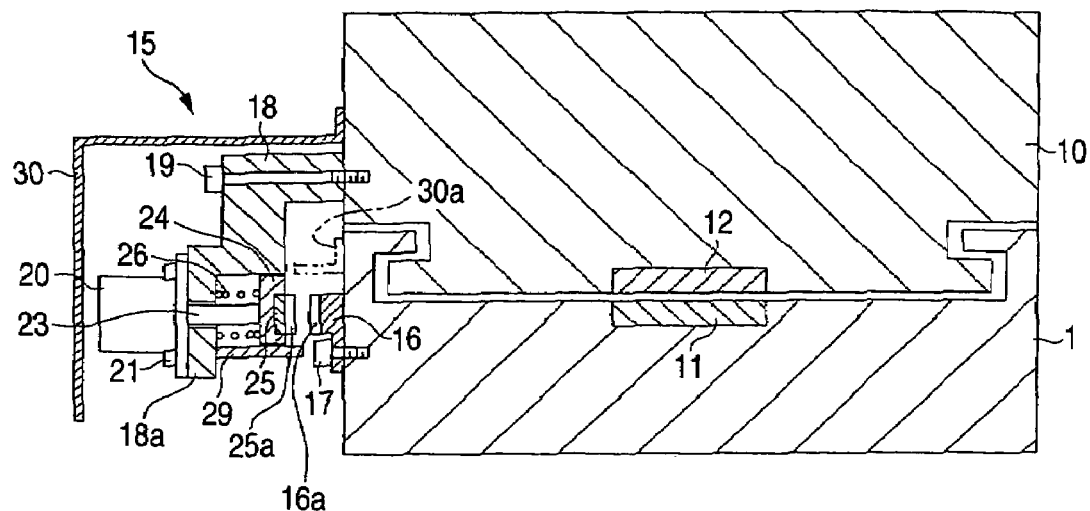
FIG. 1 is a sectional view showing a main part in one embodiment where this invention is embodied as a locking mechanism of a grinding wheel stock in a grinding machine.

As shown in FIG. 1, a fixed magnet 11 is horizontally laid on an upper surface of the center of the bed 1 so as to be oriented in a travel (backward and forward) direction of the grinding wheel stock 10. A linear motor 12 is mounted in a lower surface of the center of the grinding wheel stock 10 so as to correspond to this fixed magnet 11. Then, the grinding wheel stock 10 is constructed so as to be reciprocated in the backward and forward direction by passing current through the linear motor 12.

A motor 13 is mounted on an upper surface of the grinding wheel stock 10. A grindstone 14 functioning as a machine tool for grinding the workpiece is attached on a rotating shaft of the motor 13.

A locking mechanism 15 for retaining the grinding wheel stock 10 in an unlocked state in a state of passage of current through the linear motor 12 and retaining the grinding wheel stock 10 in a locked state when the linear motor 12 is in a stopped state during a power failure, an emergency stop or an interrupt, is mounted on sidewall surfaces of the bed 1 and the grinding wheel stock 10. This locking mechanism 15 will be described below.

Figure 2:
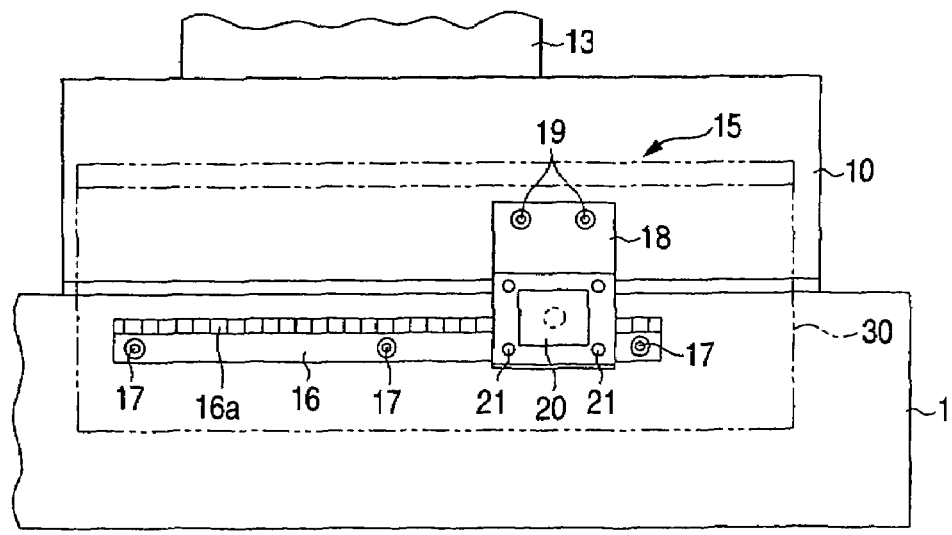
FIG. 2 is a front view of the locking mechanism.

As shown in FIG. 1, a serration member 16 having saw-toothed teeth 16a is laid on the left sidewall surface of the bed 1 in the same direction as the travel direction of the grinding wheel stock 10 horizontally as shown in FIG. 2 and is fixed in the bed 1 by plural bolts 17. The serration member 16 is provided in a range of length corresponding to the whole range of moving stroke of the grind wheel stock 10.

A bracket 18 is tightened and fixed on the left sidewall surface of the grinding wheel stock 10 by bolts 19. Amounting plate 18a is integrally formed in a lower portion of this bracket 18, and a cylinder 20 functioning as an actuator is fastened to the mounting plate 18a in a direction perpendicular to the travel direction of the grinding wheel stock 10 horizontally by bolts 21.

Figure 3:
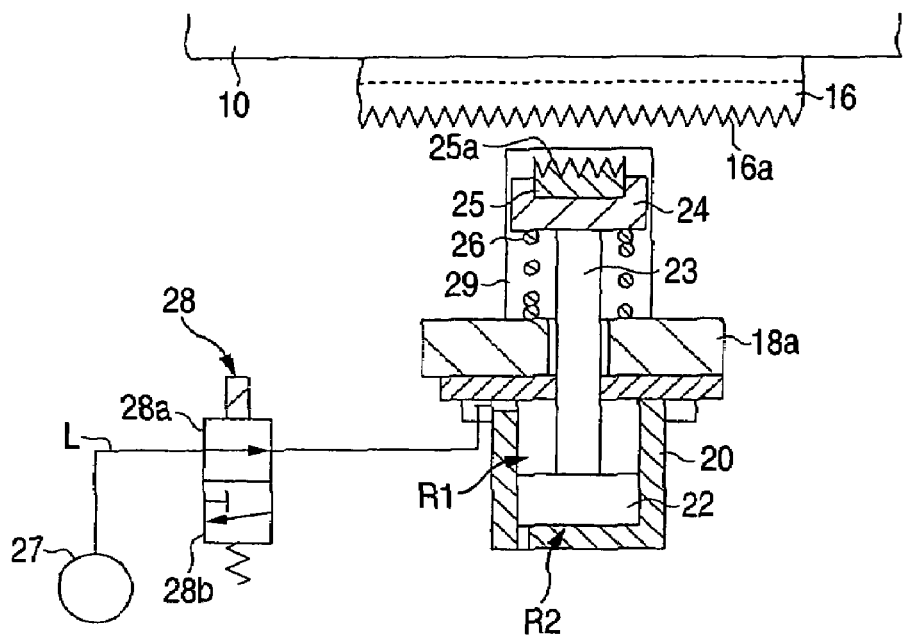
FIG. 3 is an enlarged sectional plan view of an unlocked state of the locking mechanism.

As shown in FIG. 3, a locking member 25 having saw-toothed teeth 25a is attached to the top of a piston rod 23 coupled to a piston 22 inside the cylinder 20 through a holder 24 by screws etc. A coil spring 26 acting as an urging member is interposed between the mounting plate 18a and the holder 24 so as to surround the piston rod 23, and is constructed so as to energize the locking member 25 toward the teeth 16a of the serration member 16 always. The inside of the cylinder 20 is partitioned into an atmospheric chamber R2 and an actuation chamber R1 of the rod side by the piston 22, and is constructed so as to supply a hydraulic pressure from a hydraulic supply source 27 and a pipe line L to the actuation chamber R1. An electromagnetic valve 28 capable of switching to a supply port 28a and a drain port 28b is connected on the way of the pipe line L.

Therefore, in a state in which the electromagnetic valve 28 switches to the supply port 28a and is held, a hydraulic pressure is supplied from the hydraulic supply source 27 to the actuation chamber R1 and as shown in FIG. 3, the piston 22, the piston rod 23, the holder 24 and the locking member 25 are separated from the serration member 16 against an urging force of the coil spring 26 and are held in an unlocked position in which engagement between the teeth 16a and 25a is released. Also, in a state in which the electromagnetic valve 28 switches to the drain port 28b and is retained, an actuation stopped state is realized and the hydraulic oil of the inside of the actuation chamber R1 is drained to the outside. Thus, as shown in FIG. 4, the piston 22, the piston rod 23, the holder 24 and the locking member 25 are moved to the side of the serration member 16 by elastic force of the coil spring 26 and are retained in a locked position in which the teeth 25a are engaged with the teeth 16a.

As shown in FIGS. 1 and 3, a rotation blocking plate 29 is cantilevered in a wall surface of the mounting plate 18a and a flat lower surface of the holder 24 is slidably brought into contact with an upper surface of this rotation blocking plate 29. Therefore, in the holder 24 and the locking member 25, switching between the unlocked position and the locked position in a non-rotation state is performed.

A cover 30 is horizontally attached to a left sidewall of the grinding wheel stock 10 so as to cover the whole serration member 16 over the serration member 16. The upper base edge of this cover 30 is detachably mounted to the side of the grinding wheel stock 10 by bolts (not shown). Also, as shown by a chain line in FIG. 1, a cover 30a may be fixed in a sidewall of the bed 1 so as to cover the whole upward region of the serration member 16. Incidentally, it is unnecessary to provide the cover 30, 30a when installation positions of the serration member 16 and the locking member 25 are a place separate from processing environment.

Figure 6:
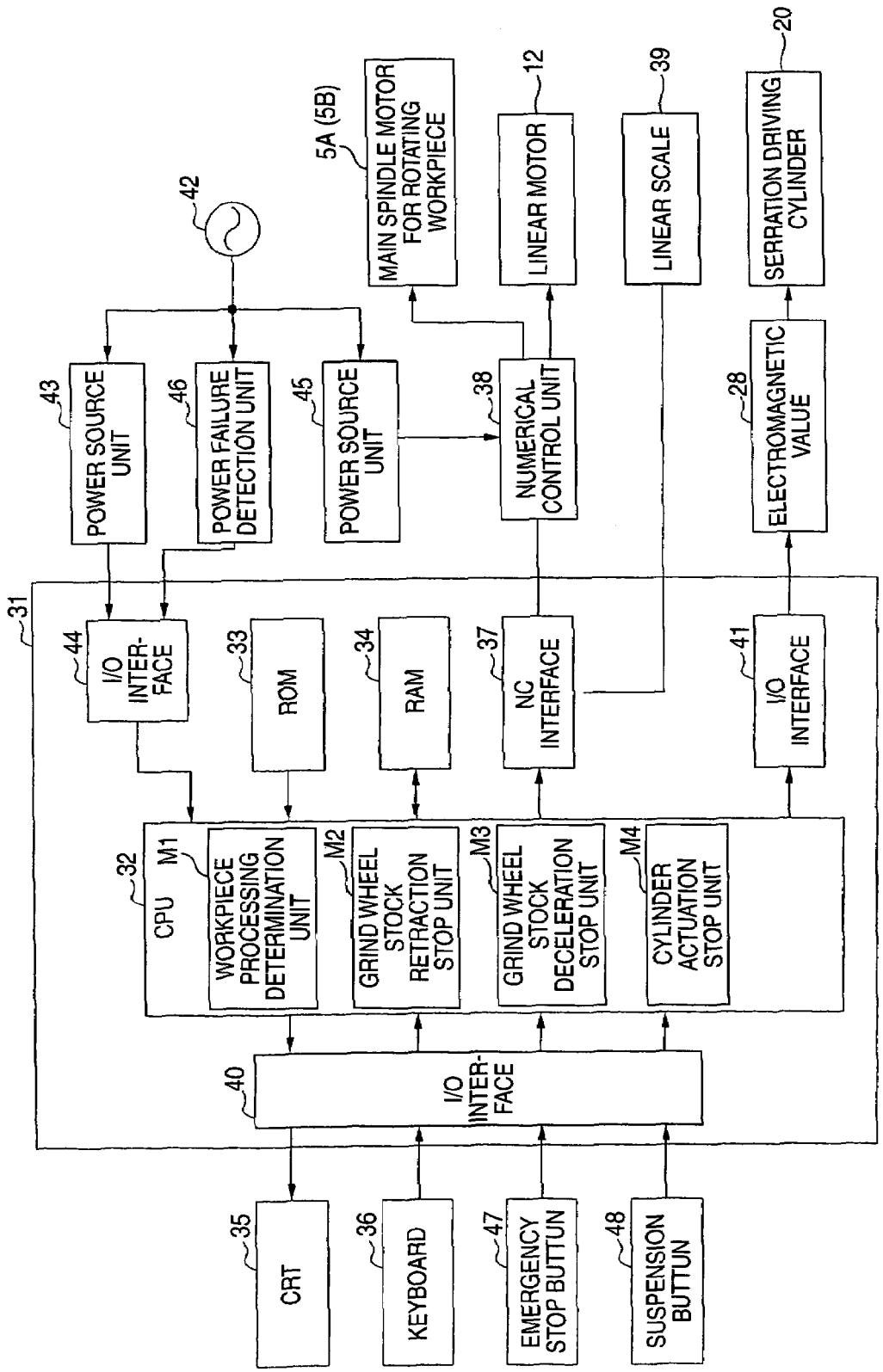
FIG. 6 is a block circuit diagram of a controller.

Next, a controller 31 of the grinding machine will be described based on FIG. 6.

Read only memory (ROM) 33 for storing a grinding work program etc. of a workpiece of a grinding machine and random access memory (RAM) 34 for storing various data are connected to a central processing unit 32 (hereinafter called a CPU (central processing unit) 32) for performing various calculation processing. Also, a display 35 for displaying data and a keyboard 36 for inputting data are connected to the CPU 32 via an I/O interface. A numerical control unit (NC) 38 is connected to the CPU 32 through an NC interface 37 and it is constructed so that an operating current is outputted from this numerical control unit 38 to the linear motor 12. It is constructed so that a detection signal of a position of the grinding wheel stock 10 detected by a linear scale 39 is inputted to the NC interface 37. Then, based on the detection signal of the position from the linear scale 39, an action of the linear motor 12 is controlled and movement of the grinding wheel stock 10 is controlled.

An electromagnetic valve 28 provided in a circuit of the cylinder 20 is connected to the CPU 32 through an I/O interface 41. A power source unit 43 connected to a power source 42 is connected to the controller 31 through an I/O interface 44 and it is constructed so that the controller 31 operates by a power source for control converted by the power source unit 43. It is constructed so that a power source converted by a power source unit 45 is supplied from the power source 42 to the numerical control unit 38.

A power failure detection unit 46 is provided between the power source 42 and the I/O interface 44 and it is constructed so as to detect a power failure state. Then, the electromagnetic valve 28 is switched from a supply port 28a to a drain port 28b while the grind wheel stock 10 is in a stopped state when a power failure state is detected by the power failure detection unit 46 in a state of passage of current through the controller 31.

A suspension button 48 and an emergency stop button 47 functioning as processing machine stop instruction unit for inputting instructions of a stop of the grinding machine are connected to the CPU 32. The stop button 47 is for instructing an emergency stop of the grinding machine itself. The suspension button 48 is for instructing suspension of a grinding operation.

The CPU 32 of the controller 31 has a workpiece processing determination unit M1 for determining whether or not a workpiece W is in processing in a state in which a power failure is detected, and a grinding wheel stock retraction stop unit M2 acting as a travel slider retraction stop unit for retracting the grinding wheel stock 10 and separating the grindstone 14 from the workpiece W to make a stop in the case of determining that the workpiece W is in processing. Also, the CPU 32 of the controller 31 has a grinding wheel stock deceleration stop unit M3 acting as a travel slider deceleration stop unit for decelerating and stopping the grinding wheel stock 10 in the case of determining that the workpiece W is not in processing, and a cylinder actuation stop unit M4 acting as an actuator actuation stop unit for stopping actuation of the cylinder 20 when the grinding wheel stock 10 is moved in a stop position.

The power source units 43, 45 include capacitors with power source capacities capable of running the controller 31 and the numerical control unit 38 for only a slight time even at the time of occurrence of a power failure, an emergency stop or suspension. As a result of that, a power source which decays with a time constant determined by the power source capacity is supplied to the linear motor 12 and the electromagnetic valve 28. Therefore, even immediately after occurrence of a power failure, a power source capable of switching of the ports is given to the electromagnetic valve 28 along with stop control of the linear motor 12 when time elapsed since the occurrence of the power failure is up to, for example, about 200 msec.

Next, an operation of the grinding machine constructed as mentioned above will be described.

When an operation setup switch (not shown) of the grinding machine is turned on in a state in which a power source is supplied from the power source 42 to the power source unit 43 of the controller 31 and the power source unit 45 of a numerical control unit 38, the electromagnetic valve 28 is energized via the I/O interface 43 and the electromagnetic valve 28 is switched from the drain port 28b to the supply port 28a. As a result of this, as shown in FIG. 3, a hydraulic pressure is supplied from the hydraulic pressure supply source 27 to the actuation chamber R1 of the cylinder 20 and the locking member 25 is separated from the teeth 16a of the serration member 16 through the piston rod 23 and is held in an unlocked state. In this state, a control current is outputted from the numerical control unit (NC) 38 shown in FIG. 6 to the linear motor 12 and the grinding wheel stock 10 is traveled in a backward and forward direction and grinding work of a workpiece is done by a grinding stone that is rotated by the motor 13 mounted in the grinding wheel stock 10.

Next, an operation of the locking mechanism 15 in case that a power failure occurs during grinding work of a workpiece will be described based on a flowchart of FIG. 7.

Figure 7:
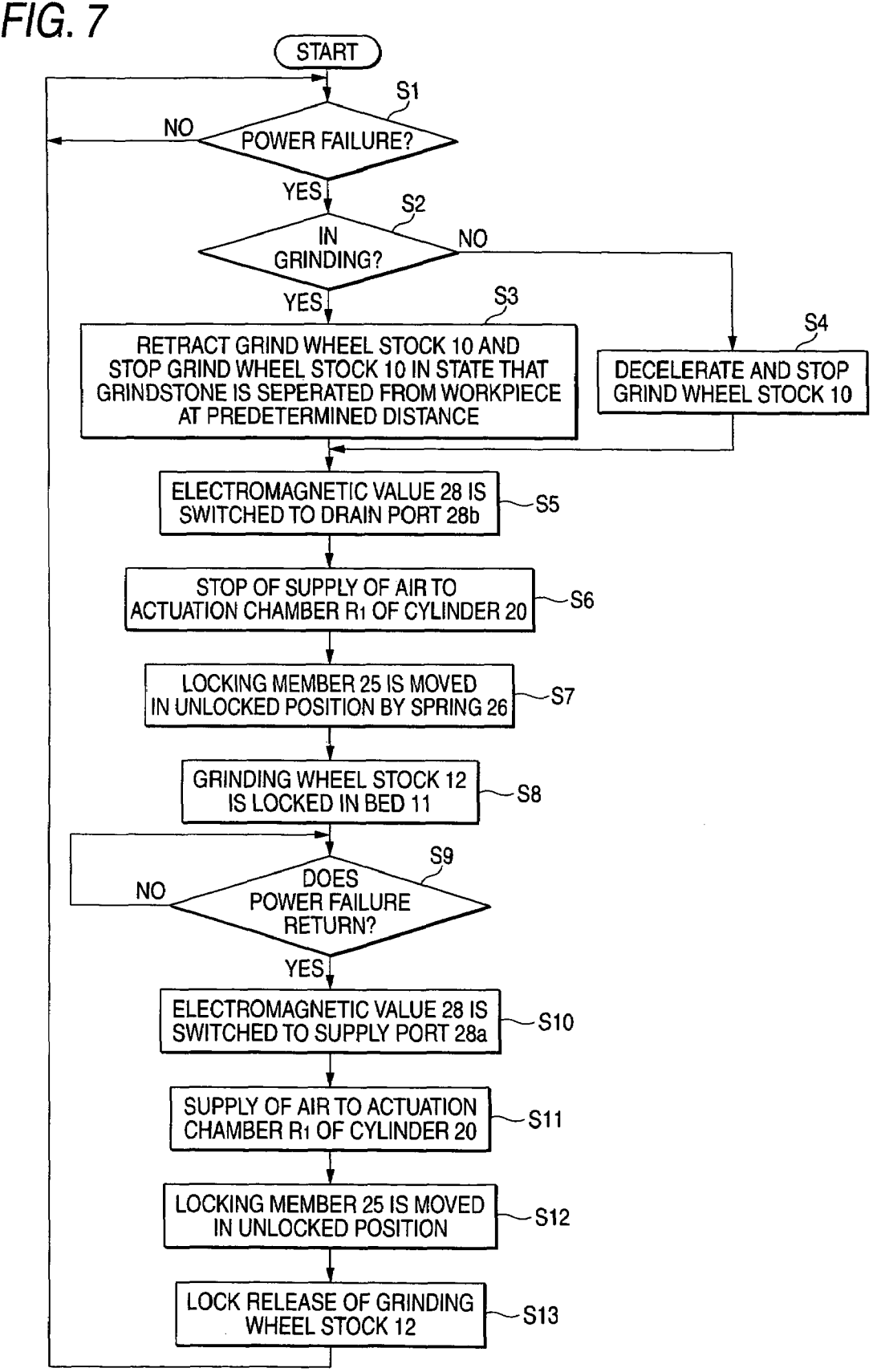
FIG. 7 is a flowchart describing an action of the locking mechanism.

In step S1 of FIG. 7, the power failure detection unit 46 monitors a voltage outputted by the power source 42 and detects whether or not a power failure occurs. The power failure detection unit 46 outputs a signal of, for example, "H (high)" when the power source 42 outputs a normal power source, and outputs a signal of "L (low)" when the power source reduces due to the power failure. Thus, when the power failure occurs (YES), the signal of "L" indicating that the power failure occurs is given from the failure detection unit 46 to the controller 31.

When the decision of YES is made in step S1, it is determined whether or not a workpiece W is ground through the grindstone 14 by the workpiece processing determination unit M1 of the CPU 32 in step S2 for a slight predetermined time during which a control action is disabled due to the power failure as described above. Then, when it is determined that it is in grinding (YES), in step S3, a retraction signal is outputted from the numerical control unit (NC) 38 to the linear motor 12 through the NC interface 37 by the grinding wheel stock retraction stop unit M2 and a retraction action of the grinding wheel stock 10 is performed and the grinding wheel stock 10 is stopped in a state in which the grindstone 14 is separated from the workpiece W by a predetermined amount (for example, 10 mm to 40 mm). Also, when it is determined that it is in ungrinding (for example, at the time of fast forwarding) in step S2 (NO), in step S4, a deceleration stop signal is outputted from the numerical control unit (NC) 38 to the linear motor 12 through the NC interface 37 by the grinding wheel stock deceleration stop unit M3 and the grinding wheel stock 10 is decelerated and stopped.

While it is a slight time of about 200 msec for which supply of a power source completely runs out due to the power failure and control cannot be performed, the linear motor 12 is operated to retract or is decelerated to be stopped by a residual power source of a capacitor of the power source unit 43, 45 and also the residual power source is also supplied to the electromagnetic valve 28 through the I/O interface 43 and the electromagnetic valve 28 continuously holds the supply port 28a. As a result of this, until the linear motor 12 completely stops, the locking member 25 is continuously retained in an unlocked position by the electromagnetic valve 28.

In step S5 following the step S3 or S4, an actuation stop signal from the cylinder actuation stop unit M4 is input to the electromagnetic valve 28 through the I/O interface 41, the electromagnetic valve 28 is switched from the supply port 28a to the drain port 28b as shown in step S3. As a result of this, supply of the hydraulic pressure to the actuation chamber R1 of the cylinder 20 is stopped as shown in step S6. By this, the locking member 25 is moved in a locked position by the coil spring 26 as shown in step S7, and the grinding wheel stock 10 is locked in the bed 1 as shown in step S8. In this lock action, the teeth 25a of the locking member 25 are engaged with the teeth 16a of the serration member 16 in a stop state, so that damage to the teeth 16a, 25a is prevented.

Then, in step S9, the CPU 32 decides whether a power failure state is recovered and in the case of YES, the electromagnetic valve 28 is energized and is switched from the drain port 28b to the supply port 28a in step S8. The hydraulic pressure is supplied to the actuation chamber R1 of the cylinder 20 in step S9. The locking member 25 is moved in an unlocked position in step S10. By this, the locked state of the grinding wheel stock 10 is released as shown in step S11.

On the other hand, in the case that an emergency stop button 47 or a suspension button 48 of the grinding wheel stock 10 is turned on by an operator, even when the power failure detection unit 46 does not detect a power failure state, the determination is made as to whether the state is in an emergency stop or not, or whether the state is in an interrupt or not. Thereafter, the operations similar to steps S3-S13 are performed.

According to the locking mechanism 15 of the grinding wheel stock 10 in the grinding machine of the embodiment described above, the following effects can be obtained.

(1) In the embodiment, the serration member 16 having the teeth 16a is fixed on a sidewall surface of the bed 1 and the bracket 18 is attached to a sidewall surface of the grinding wheel stock 10 and the cylinder 20 is mounted in the lower end of this bracket 18 and the locking member 25 is attached to the piston rod 23 through the holder 24. Also, it is constructed so as to switch to a locked state in which the teeth 25a of the locking member 25 are engaged with the teeth 16a of the serration member 16 by releasing an unlocked state of the locking member 25 by the cylinder 20 while the grind wheel stock 10 is stopped, when a power failure state is detected during grinding work of the grinding machine. As a result of this, in the power failure state, the grinding wheel stock 10 can surely be held in a stop position by the locking mechanism 15.

(2) In the embodiment, it is constructed so that it is decided whether or not a workpiece W is in grinding and when it is in grinding, the grindstone 14 is stopped and locked in a state of being separated from the workpiece W by a predetermined amount, so that the grinding wheel stock 10 can be stopped without damaging the workpiece W or the grindstone 14. In case of immediately stopping the grinding wheel stock 10 when a power failure occurs, there is fear that the grindstone 14 bites into the workpiece W and breakage of the workpiece W or the grinding machine is caused when a stop of the main spindles 5A, 5B for rotating and driving the workpiece W is not timed to a stop of the grinding wheel stock 10 for forward and backward moving the grindstone 14, but in this embodiment, the fear can be solved.

As a processing action stop method of a machine tool for solving the problem described above more surely, the applicant of the present application has proposed means described in JP-A-2002-182714 (U.S. Pat. No. 6,626,735). In this stop method, data based on a tool retraction calculation formula for retracting a tool (grindstone 14) from a workpiece is stored in storage of a controller and when a power failure is detected, the data based on the tool retraction calculation formula is added to processing locus profile data. Then, it is constructed so that within time during which a control action by the controller is disabled, the tool (grindstone 14) is retracted from the workpiece while synchronizing with rotation of the main spindles (5A, 5B) based on the processing locus profile data added and then a machine tool (grinding wheel stock 10) is stopped and the grindstone 14 is prevented from biting into the workpiece W. This configuration and method may be applied to the present embodiment.

(3) In the embodiment, it is constructed so as to engage the teeth 25a of the locking member 25 with the teeth 16a of the serration member 16, so that the grinding wheel stock 10 can surely be held in a stop position without increasing urging force of the locking member 25 by the coil spring 26. Since the urging force of the coil spring 26 can be set to the necessary minimum, power for holding the cylinder 20 in an unlocked state can be reduced, and weight reduction and miniaturization of the cylinder 20 and an actuator driving unit for driving the cylinder, such as the hydraulic supply source 27 or the like, can be achieved.

(4) In the embodiment, the cover 30 or 30a is provided on a sidewall of the grinding wheel stock 10, or on a sidewall of the bed 1, so as to cover an upper portion of the serration member 16. Accordingly, during grinding work of the workpiece, the teeth 16a of the serration member 16 is prevented from clogging due to adherence of a cut powder, a coolant, or dust generated from a workpiece, thereby allowing the teeth 16a and the teeth 25a of the locking member 25 to keep a state of reliable mutual engagement and allowing the locking mechanism 15 to retain operational reliability over a long term.

(5) In the embodiment, the serration member 16 is provided in a length range corresponding to the whole region of a movement stroke of the grinding wheel stock 10, so that a locking function by the locking member 25 and the serration member 16 can be performed even when the grinding wheel stock 10 stops in any position at the time of a power failure.

Next, another embodiment of the invention will be described based on FIGS. 8 to 11.

Figure 10:
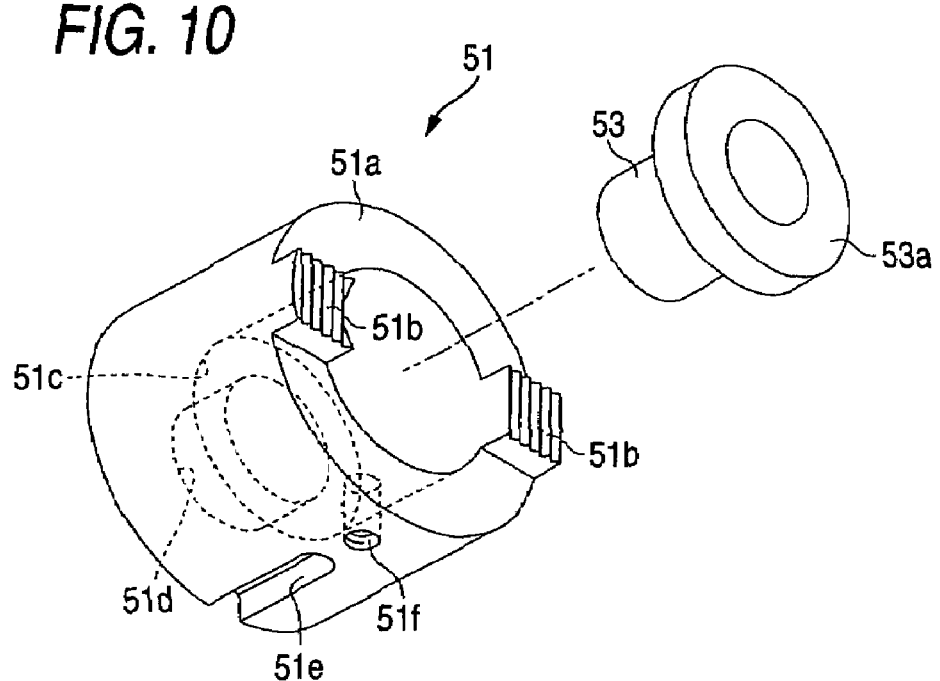
FIG. 10 is an exploded perspective view of a locking member and a flange fixture of the locking mechanism of FIG. 8.

In this embodiment, a receiving tubular part 18b is formed integrally with the mounting plate 18a of the bracket 18 and a closed-end cylindrical locking member 51 is fitted into an inner circumference surface 18c of the receiving tubular part 18b slidably forward and backward in an axial direction of the piston rod 23. As shown in FIG. 10, teeth 51b engaged with the teeth 16a of the serration member 16 are formed in two places of a top surface of a cylindrical body 51a of the locking member 51. The piston rod 23 is inserted into a through hole 51d formed in the bottom 51c of the locking member 51 so that the locking member 51 can be moved in an unlocked direction. A key way 51e parallel to an axis line is formed in a lower outer circumference surface of the body 51a of the locking member 51, and a key bolt 52 for whirl stop screwed from the outside with respect to the receiving tubular part 18b is engaged with the key way 51e, and the locking member 51 is fitted in a whirl stop state slidably in an axial direction within the receiving tubular part 18b of the bracket 18.

Figure 9:
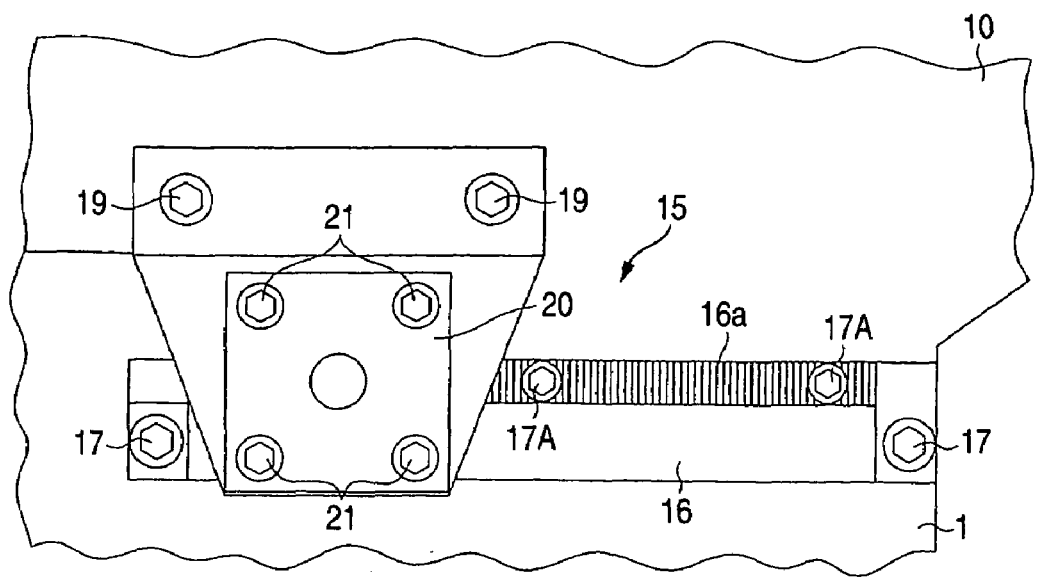
FIG. 9 is a front view of the locking mechanism of FIG. 8.

A flange fixture 53 is fitted and fixed in the piston rod 23 and a flange part 53a of the flange fixture is engageably opposed to the bottom 51c of the locking member 51. A stop bolt 54 is screwed in a screw hole 51f formed in the body 51a of the locking member 51 and it is constructed so as to regulate an advance limit position of the piston rod 23 in engagement with the flange fixture 53. Incidentally, the teeth 16a of the serration member 16 are fixed in the grinding wheel stock 10 by plural bolts 17A as shown in FIG. 9.

Next, an operation of the locking mechanism 15 constructed as mentioned above will be described.

Figure 8:
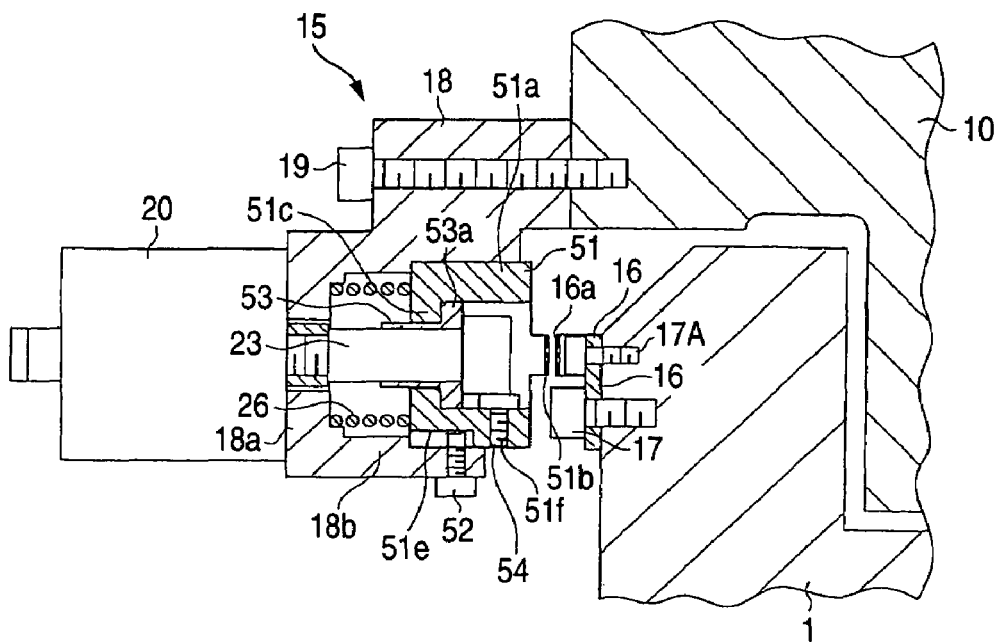
FIG. 8 is a sectional view of an unlocked state showing another example of a locking mechanism.
Figure 11:
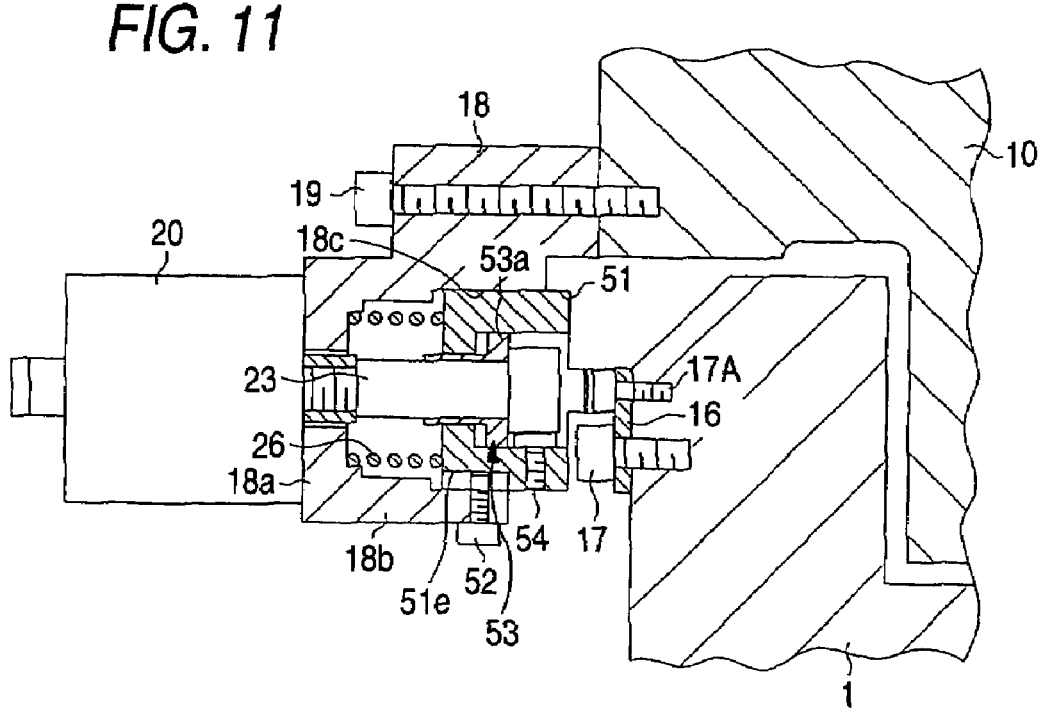
FIG. 11 is a sectional view of a locked state of the locking mechanism of FIG. 8.

FIG. 8 shows a state in which grinding processing of a workpiece W by the grindstone 14 is performed and the cylinder 20 is actuated and the piston rod 23 is moved against an urging force of the coil spring 26 and the locking member 51 is held in an unlocked position along with the flange fixture 53. In this state, for example, when a power failure is detected by the power failure detection unit 46 and actuation of the cylinder 20 is stopped with the grinding wheel stock 10 stopped, the piston rod 23 is advanced and pressure on the locking member 51 by the flange fixture 53 is released and the locking member 51 is moved in a right direction in FIG. 8 by the coil spring 26 accumulated and energized and as shown in FIG. 11, the teeth 51b of the locking member 51 are engaged with the teeth 16a of the serration member 16 and switching to a locked state is performed. Further, in the locked state of the locking member 51, the piston rod 23 and the flange fixture 53 can be moved forward somewhat and it is in a state separated from the piston rod 23, so that the locking member 51 is held in a locked position by stable holding force through the coil spring 26. In addition, engagement with the serration member 16 is performed in two places, so that secure position holding force can be obtained.

In this embodiment, the body 51a of the locking member 51 is fitted into the receiving tubular part 18b of the bracket 18 and the key way 51e is incorporated by the receiving tubular part 18b, so that the coil spring 26 and key way 51e can be shielded from the outside to prevent intrusion of dust and durability can be improved.

Incidentally, the embodiment may be changed in the following manner.

It may be constructed so that the serration member 16 of the locking mechanism 15 is mounted to the side of the grinding wheel stock 10 and the bracket 18, the cylinder 20 and the locking member 25, etc. are mounted on the bed 1.

A leaf spring, a bar spring or a rubber member with elastic force, etc. may be used instead of the coil spring 26 acting as an urging member.

An electromagnetic solenoid or other actuators may be used instead of the cylinder 20 functioning as an actuator. When the electromagnetic solenoid is used, in a state in which a power failure is detected, the energization of electromagnetic solenoid is stopped at the same time as the residual power supply runs out and the grind wheel stock 10 is stopped, and the teeth 25a of the locking member 25 are engaged with the teeth 16a of the serration member 16 by the coil spring 26. As a result of this, as compared with the embodiment using the cylinder 20 and the electromagnetic valve 28, the number of parts is reduced and manufacture and assembly work are facilitated and cost reduction can be achieved.

The serration member 16 of the locking mechanism 15 may be provided upward in a side part of the bed 1, and the bracket 18, the cylinder 20 and the locking member 25, etc. may be provided downward in a side part of the grinding wheel stock 10.

The grinding wheel stock retraction stop unit M2 and the workpiece processing determination unit M1 for determining whether or not the workpiece is in processing may be omitted.

The embodiment has been embodied in the grinding machine, but it may be embodied as a locking mechanism of a travel slider in other processing machines for performing various processing of a workpiece other than this grinding machine.

(Definition) In the invention, a bed is not limited to a stationary stock of a processing machine and it is understood that the bed also includes a movable stock for moving another control shaft as long as the bed is a stock in which a travel slider is guided and supported according to a machine configuration.

Next, another embodiment of a grinding machine in which the invention is embodied will be described below according to the drawings.

In this embodiment, it is possible to selectively grind a workpiece of an imperfect circular body in which a ground part rotates and a workpiece of a perfect circular body in which a ground part revolves, to reduce the number of grinding machines and to downsize an installation space.

Figure 13:
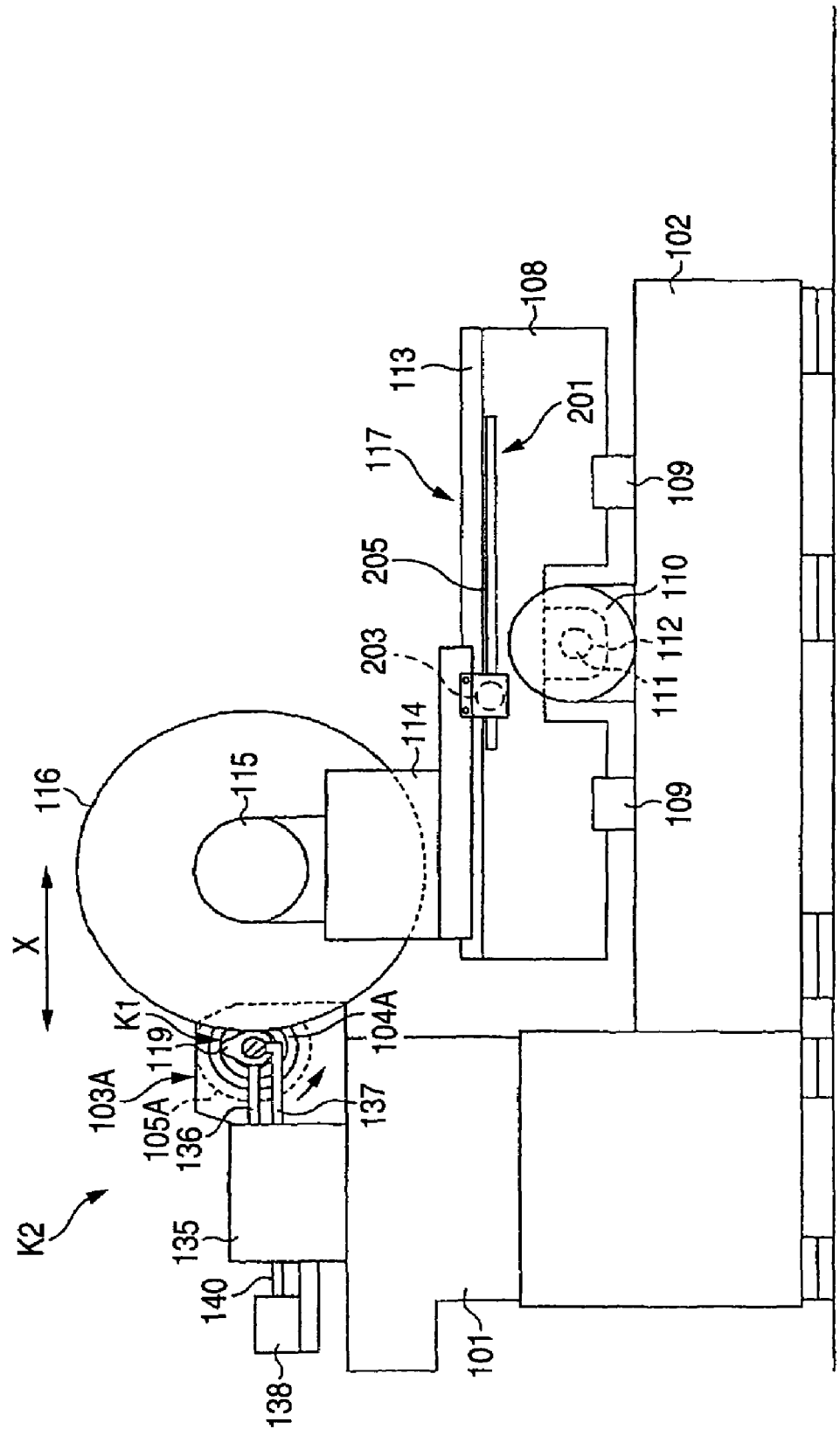
FIG. 13 is a right side view of a grinding machine.
Figure 14:
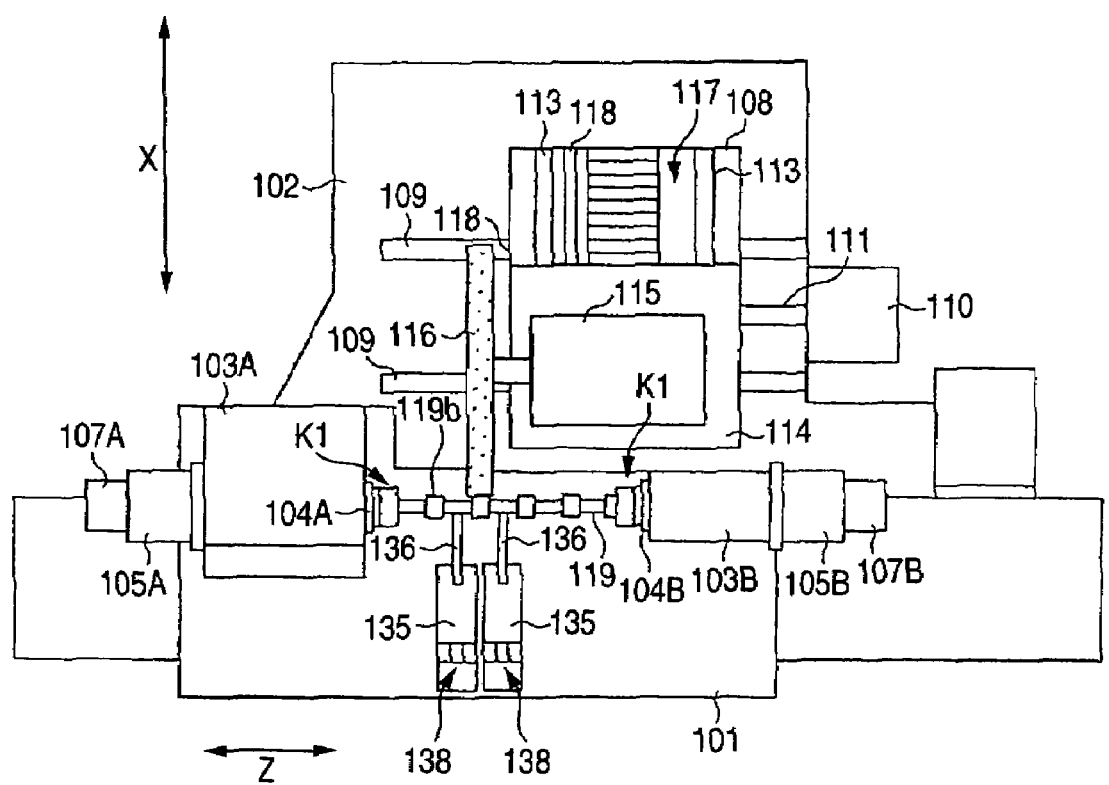
FIG. 14 is a plan view of the grinding machine.

As shown in FIGS. 13 and 14, a workpiece support stock 101 is supported on an upper surface of one side of a bed 102. Main spindle stocks 103A, 103B are disposed on an upper surface of the workpiece support stock 101, and include main spindles 104A, 104B for removably supporting both ends of a cam shaft 119 and motors 105A, 105B functioning as servomotors for rotating the main spindles 104A and 104B.

As shown in FIG. 14, the right main spindle stock 103B is movably disposed by a position adjustment mechanism (not shown) with respect to the upper surface of the workpiece support stock 1 so as to adjustably set a spacing between the left main spindle 104A and the right main spindle stock 103B. Then, the cam shaft 119 is rotated in a predetermined direction by synchronous rotation driving of both the motors 105A, 105B for main spindle in this support state. Encoders 107A, 107B acting as a main spindle rotational angle detection unit are attached to the motors 105A, 105B for main spindle, and detection signals from the encoders 107A, 107B are inputted to a numerical control unit 141 described below.

A Z axis movement saddle 108 is supported reciprocably in a direction of the Z axis by a pair of guide rails 109 laid on the bed 102 mutually parallel in the direction of the Z axis. A motor 110 for Z axis movement rotated forward and backward is installed in the bed 102 and a ball screw 111 rotated forward and backward is screwed in a ball screw nut 112 attached to a lower surface of the Z axis movement saddle 108. Then, when the motor 110 for Z axis movement is actuated, the Z axis movement saddle 108 is reciprocated in the directions along the Z axis. On an upper surface of the Z axis movement saddle 108, a pair of guide rails 113 is supported mutually parallel so as to be oriented in a horizontal direction (X axis direction) perpendicular to the longitudinal axis of the cam shaft 119. In the guide rails 13, a grinding wheel stock 114 is supported movably in a direction of the X axis. A built-in motor 115 is installed on an upper surface of this grinding wheel stock 114, and a grindstone 116 is supported in a rotating shaft of this built-in motor 115 so as to be opposed to the cam shaft 119. A linear motor 117 is provided between the Z axis movement saddle 108 and the grinding wheel stock 114, and the grinding wheel stock 114 is moved in a direction close to or separate from the cam shaft 19 by this linear motor 117. A linear scale 118 functioning as a position detection unit of the grinding wheel stock 114 (grindstone 116) is provided between the bed 102 and the grinding wheel stock 114, and a detection signal from this linear scale 118 is inputted to the numerical control unit 141 described below.

Further, as shown in FIG. 13, a lock mechanism 201 is disposed on a side of the grind wheel stock 114 and a side of the Z axis movement saddle 108. The lock mechanism 201 has a locking member 203 and a serration member 205 that is engageable with the locking member 203. The serration member 205 is attached to the Z axis movement saddle 108 so as to extend along the X axis. The locking member 203 and the serration member 205 have the same structures as the locking member 125 and the serration member 116 in the above embodiment. The rest of the structure of the locking mechanism 201 is also similar to that of the locking mechanism 115 in the above embodiment. The lock mechanism 201 is operated similar to the lock mechanism 115 in the above embodiment, that is, in a state of power failure, the locking member 203 is engaged with the serration member 205, thereby stopping and holding the Z axis movement saddle 108.

Figure 17:
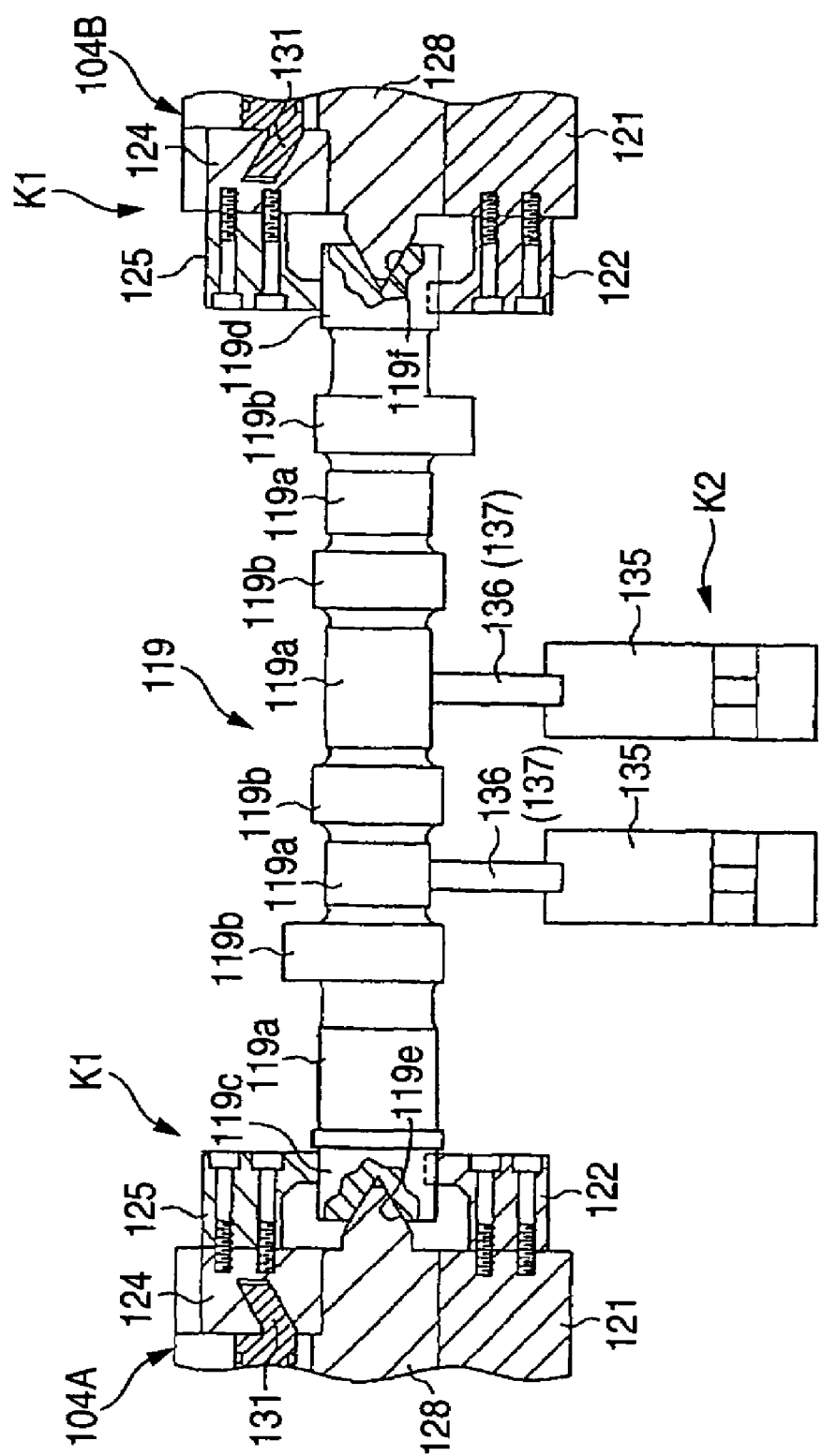
FIG. 17 is a sectional view showing a clamp state of a cam shaft.

FIG. 17 shows a cam shaft 119 acting as a workpiece. This cam shaft 119 includes a plurality of journal parts 119a each having a cylindrical column shape and a plurality of cam parts 119b acting as an imperfect circular body (ground part). A first center hole 119e and a second center hole 119f are formed in end faces of the left and right journal parts 119c, 119d that is provided at the both ends of the cam shaft 119.

Figure 18:
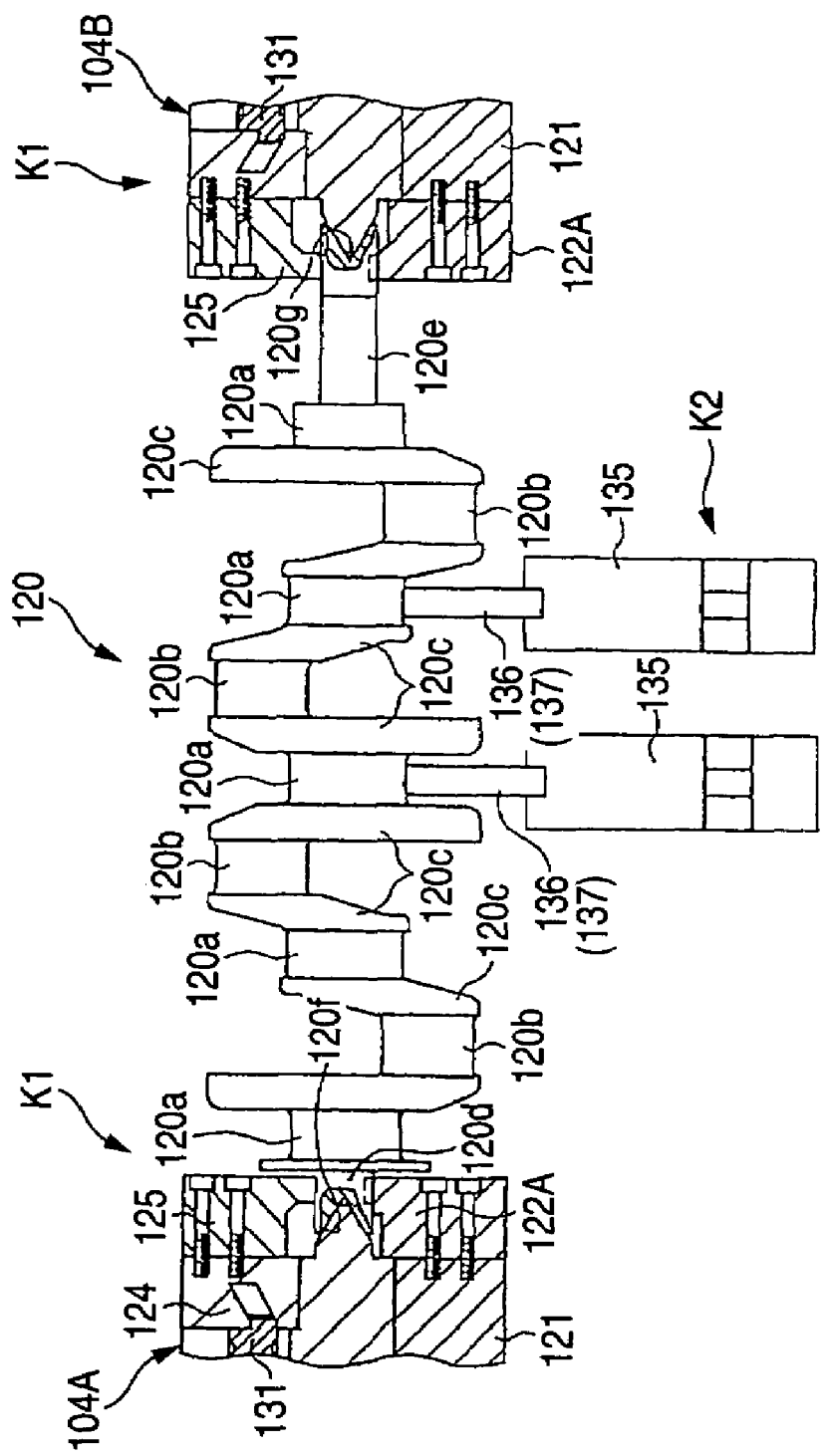
FIG. 18 is a sectional view showing a clamp state of a crankshaft.

FIG. 18 shows a crankshaft 120 acting as a workpiece. This crankshaft 120 includes a plurality of journal parts 120a each having a cylindrical column shape, plural pin parts 120b acting as a revolving perfect circular body (ground part) and crank arms 120c for mutually coupling the journal parts 120a and the pin parts 120b. A first center hole 120f is formed in an end face of the journal part 120d of the left end and a second center hole 120g is formed in an end face of the journal part 120e of the right end.

Next, workpiece clamping mechanisms K1, K1 which are respectively provided in the pair of main spindles 104A, 104B and the holder 106 and clamp both ends of the cam shaft 119 or the crank shaft 120 will be described based on FIGS. 15 to 18. Since the two workpiece clamping mechanisms K1, K1 are constructed similarly, the workpiece clamping mechanism K1 of the left side of the main spindle 104A will be described.

Figure 15:
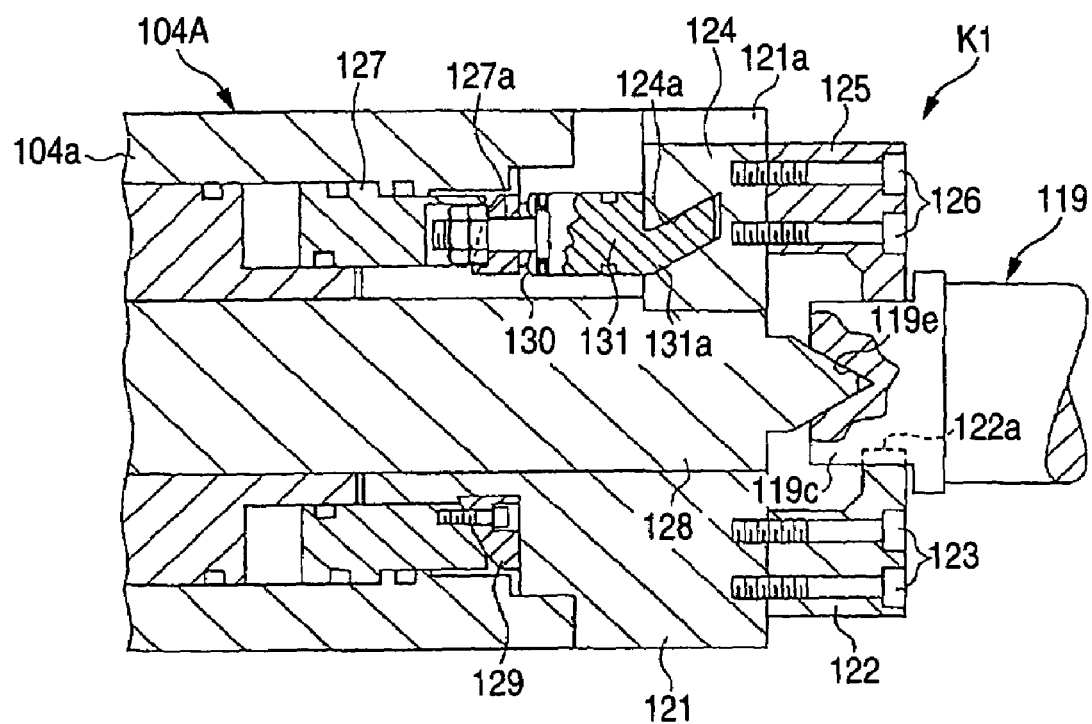
FIG. 15 is an enlarged sectional view of a workpiece clamping mechanism provided in a main spindle stock.

This workpiece clamping mechanism K1 can clamp the top of one journal part 119c of the cam shaft 119 as shown in FIGS. 15 and 17. Also, this workpiece clamping mechanism K1 can clamp one journal part 120d of the crankshaft 120 as shown in FIG. 18.

Figure 16:
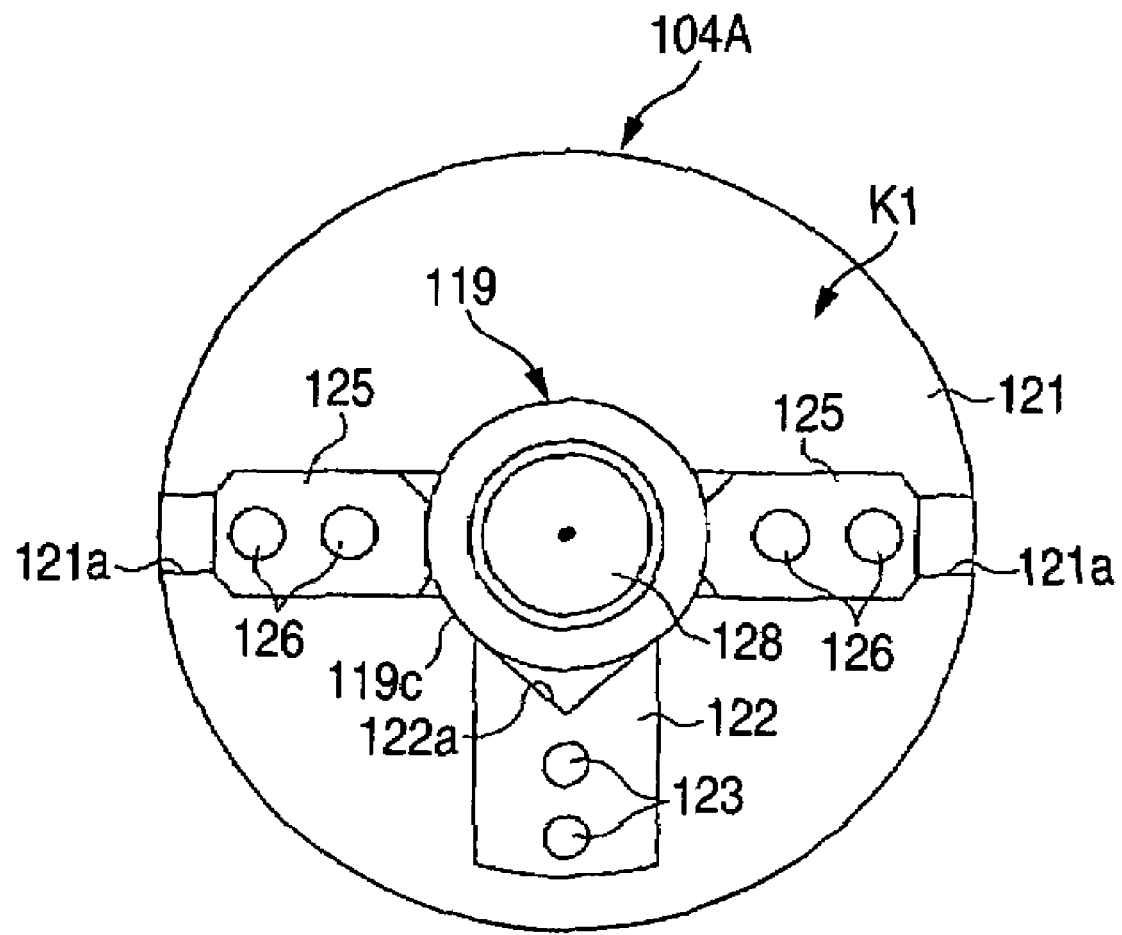
FIG. 16 is a front view of the workpiece clamping mechanism similarly.

As shown in FIG. 15, a chuck body 121 is provided in the top of a cylindrical frame 104a constituting the main spindle 104A and in a front end face of the chuck body 121, one fixed chuck claw 122 is removably fixed by bolts 123. Also, a substantially V-shaped support surface 122a with facing shape is formed in the inner edge of the fixed chuck claw 122 as shown in FIG. 16. In the front end face of the chuck body 121, guide grooves 121a are formed in two places and in the guide grooves 121a, a movable mounting block 124 is supported movably in a radial direction. In the front of the movable mounting block 124, chuck claws 125 are tightened and fixed by bolts 126 so as to correspond to the fixed chuck claw 122. Then, it is constructed so that an outer circumference surface of the journal part 119c of the cam shaft 119 is clamped between each of the chuck claws 122, 125 from the outer circumference side by moving both the movable chuck claws 125, 125 in a grasp position of the inside by a cylinder 127 provided inside the frame 104a.

A center part of the chuck body 121 of the main spindle 104A is provided with a first centering center 128 which is engaged with the first center hole 119e of the journal part 119c and centers and clamps the journal part 119c. A first spherical bearing 129 is supported in the frame 104a of the main spindle 104A. A piston rod 127a of the cylinder 127 extends through the first spherical bearing 129, and a cam member 131 is supported in the top of the piston rod 127a through a second spherical bearing 130. An inclined cam part 131a of the top of the cam member 131 is fitted into a cam groove 124a of the movable mounting block 124. Then, by forward and backward movement, the movable chuck claws 125, 125 are opened and closed by action of the inclined cam part 131a and the cam groove 124a. Also, the movable chuck claws 125 can be floated (swung) by action of the first and second spherical bearings 129, 130.

An operation for changing from a clamp state of the cam shaft 119 shown in FIGS. 15 and 17 to a clamp state of the crank shaft 120 as shown in FIG. 18 is performed in the following manner. In FIG. 15, the cylinder 127 is actuated and the cam member 131 is retracted and the movable mounting block 124 and the chuck claws 125 are moved outward in a radial direction. After the fixed chuck claw 122 dedicated to the cam shaft 119 is detached, a fixed chuck claw 122A dedicated to the crank shaft 120 is attached as shown in FIG. 18. Then, the fixed chuck claw 122A and the chuck claws 125 are tightened in the journal part 120d of the crankshaft 120. The other journal parts 119d, 120e of the cam shaft 119 and the crank shaft 120 are grasped by the workpiece clamping mechanisms K1 provided in the right side main shaft 104B as shown in FIGS. 17 and 18.

Next, a workpiece rest mechanism K2 for preventing the deformation during grinding work of the cam shaft 119 or the crank shaft 120 will be described based on FIGS. 13 and 14.

An upper surface of the workpiece support stock 101 is provided with a pair of support bodies 135 in two places at a predetermined spacing in a direction of the Z axis, and arms 136, 137 are cantilevered in the tops of both the support bodies 135. The support bodies 135 are provided with position switching mechanisms 138 for switching a position by forward and backward moving the arms 136, 137 in a direction of the X axis.

Therefore, in the case of doing grinding work of the cam part 119b of the cam shaft 119, as shown in FIG. 17, a pair of the left and right arms 136, 137 are respectively brought into contact with outer circumference surfaces of two journal parts 119a in two places and the journal parts 119a are held in predetermined positions. On the other hand, in the case of doing grinding work of the crankshaft 120, as shown in FIG. 18, the arms 136, 137 are brought into contact with outer circumference surfaces of two journal parts 120a of the crankshaft 120 in a state of adjusting a pitch and the journal parts 120a are held in predetermined positions.

Figure 12:
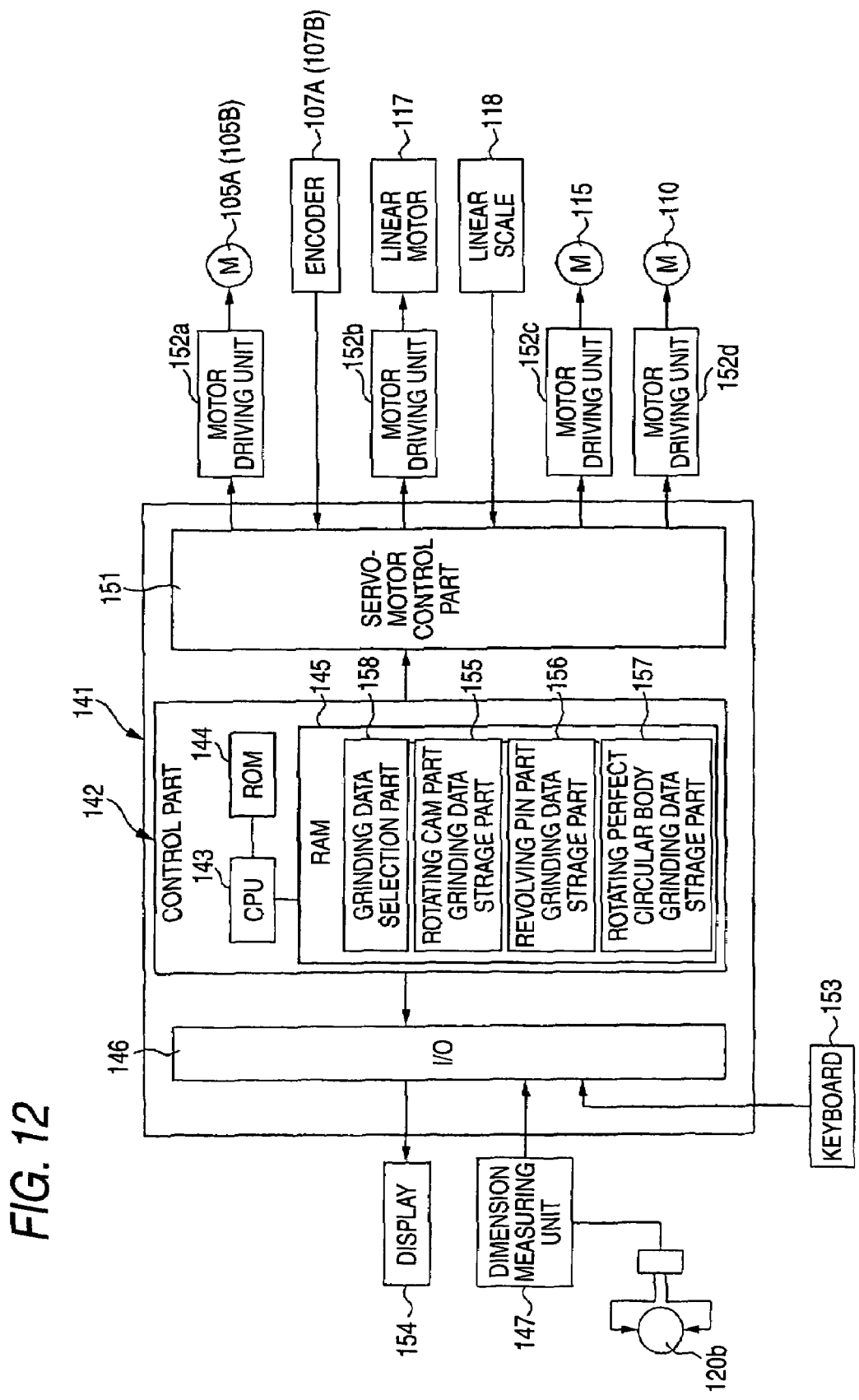
FIG. 12 is a block circuit diagram showing a numerical control unit of a grinding machine showing one embodiment in which this invention is embodied.

Next, a numerical control (NC) unit 141 of the grinding machine constructed as mentioned above will be described according to FIG. 12.

This numerical control unit 141 functions as a controller for controlling an operation of the whole apparatus. A control part 142 of this numerical control unit 141 has a CPU (central processing unit) 143 for performing various calculation processing, a ROM (read only memory) 144 for storing a program data for controlling an operation of the whole apparatus or the like, and a RAM (random access memory) 145 for temporarily storing various information.

A dimension measuring unit 147 for measuring an outside diameter dimension of a pin part 120b of the crank shaft 120 is connected to the control part 142 through an interface 146. It is constructed so that a finish shape of the pin part 120b, that is, a diameter dimension of the pin part 120b is measured stepwise in the circumferential direction by this dimension measuring unit 147. The motor 105A, 105B for main spindles, the linear motor 117, the built-in motor 115 and the motor 110 for Z axis movement are connected to the control part 142 through a servomotor control part 151 and motor driving units 152a, 152b, 152c and 152d. Further, a keyboard 153 for inputting various data and a display 154 for displaying various data on a screen are connected to the control part 142 through an interface 146. The encoders 107A, 107B and the linear scale 118 are connected to the control part 142 through the servomotor control part 151.

The RAM 145 is provided with a rotating cam part grinding data storage part 155 functioning as a first storage for storing imperfect circular rotating body grinding data used for grinding an outer circumference surface of the cam part 119b of the cam shaft 119 as an imperfect circular body. Also, the RAM 145 is provided with a revolving pin part grinding data storage part 156 functioning as a second storage for storing perfect circular rotating body grinding data used for grinding an outer circumference surface of the pin part 120b of the crankshaft 120 as a revolving perfect circular body. In this embodiment, a function of generating profile data functioning as imperfect circular body grinding data for grinding an outer circumference surface of the rotated cam part 119b of the cam shaft 119 is given to the control part 142. It is constructed so as to previously generate the grinding profile data based on lift data representing the final finish shape of the outer circumference surface of the cam part 119b. Also, a function of creating grinding program data functioning as perfect circular revolving body grinding data used for grinding an outer circumference surface of the revolving pin part 120b of the crank shaft 120 is given to the control part 142.

The RAM 145 is provided with a rotating perfect circular body grinding data storage part 157 acting as third storage for storing perfect circular rotating body grinding data for grinding a rotating perfect circular body rotated at the center of workpieces which are the journal parts 119a, 120a of the cam shaft 119 or the crank shaft 120 or workpieces with cylindrical shape or cylindrical column shape, etc. (not shown). Also, a function of creating grinding program data acting as rotating perfect circular body grinding data for grinding an outer circumference surface of the workpiece with cylindrical shape or cylindrical column shape, etc. or the journal parts 119a, 120a is given to the control part 42.

The RAM 145 is provided with a grinding data selection part 158 for selecting the profile data or the program data of any one of the rotating cam part grinding data storage part 155, the revolving pin part grinding data storage part 156 and the rotating perfect circular body grinding data storage part 157.

Next, an operation of the grinding machine constructed as mentioned above will be described.

First, the case of doing grinding work of an outer circumference surface of the cam part 119b in a state in which the camshaft 119 is mounted in the workpiece clamping mechanisms K1, K1 of the main spindles 104A and 104B as shown in FIG. 17 will be described.

Figure 19:
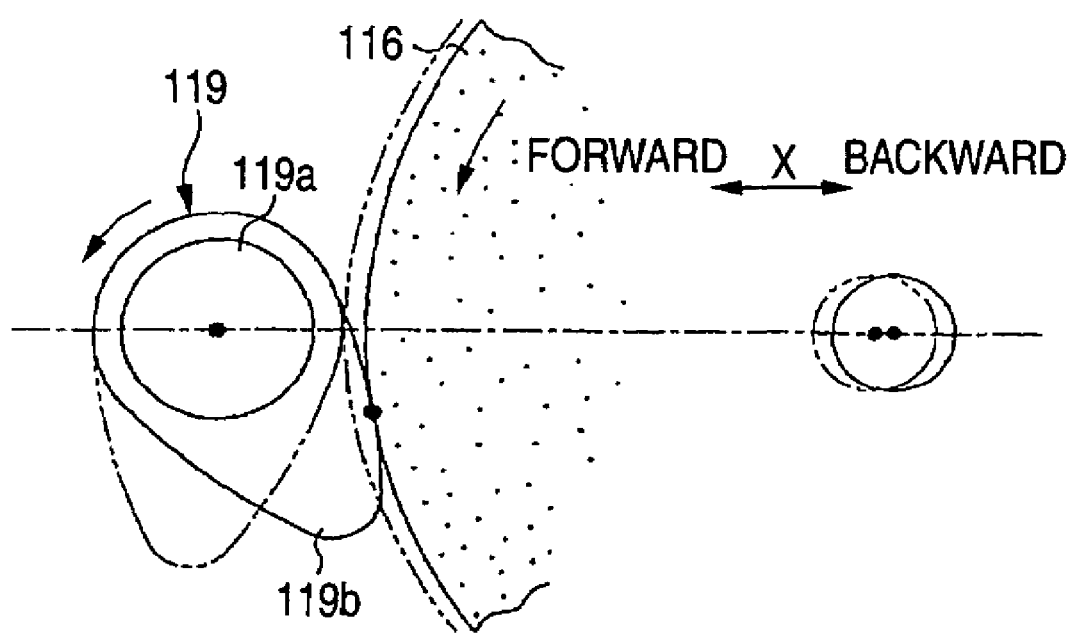
FIG. 19 is a front view describing a grinding action of the cam shaft.

In the case of grinding this cam shaft 119, when the keyboard 153 is operated so that the grinding wheel stock 114 is controlled to move in a direction along the Z axis, thereby disposing the predetermined cam part 119b to be opposed to the grindstone 116. After that, grinding profile data for grinding the cam shaft is selected from the rotating cam part grinding data storage part 155 by operating the grinding data selection part 158. Based on the grinding profile data, rotation of the motor 105A, 105B for main spindles, the linear motor 117 and the built-in motor 115 is controlled and a finish grinding operation for the outer circumference surface of the cam part 119b is performed. In this grinding operation, when the cam shaft 119 is rotated as shown in FIG. 19, a cam part 119b with imperfect circular shape is also swiveled and moved and the grindstone 116 is moved forward and backward in a direction of the X axis according to this rotational angle.

In grinding operation of the cam shaft 119, based on a detection signal from the encoder 107A, 107B and the linear scale 118, a rotational angle and a rotational speed of the cam part 119b are calculated and also a movement position etc. in a direction of the X axis of the grinding wheel stock 114 are calculated. Then, based on these calculated results and the profile data for cam shaft grinding, the numerical control unit 141 rotates or drives the motor 105A, 105B for main spindles, the linear motor 117 and the built-in motor 115, swivels the cam part 119b at a nonuniform speed and controls a position of the direction of the X axis of the grinding wheel stock 114 according to the swiveling of the cam part 119b as shown in FIG. 19. As results of these, an outer circumference surface of the predetermined cam part 119b is ground in an imperfect circular shape corresponding to grinding profile data. Following of this, the grindstone 116 is controlled to move in a direction along the Z axis shown in FIG. 3 by the motor 110 for Z axis movement, so as to grind another cam part 119b.

Next, a method for grinding the pin part 120b of the crankshaft 120 using the grinding machine constructed as mentioned above will be described. In this case, as shown in FIG. 18, the journal parts 120d, 120e of the crank shaft 120 are clamped by the workpiece clamping mechanisms K1, K1 of the main spindles 104A, 104B. Then, in FIG. 12, the keyboard 153 is operated and grinding program data of the pin part 120b recorded in the revolving pin part grinding data storage part 156 is selected by the grinding data selection part 158. Then, grinding work of the pin part 120b is done based on this data. Details of this grinding work will be described below.

Figure 20:
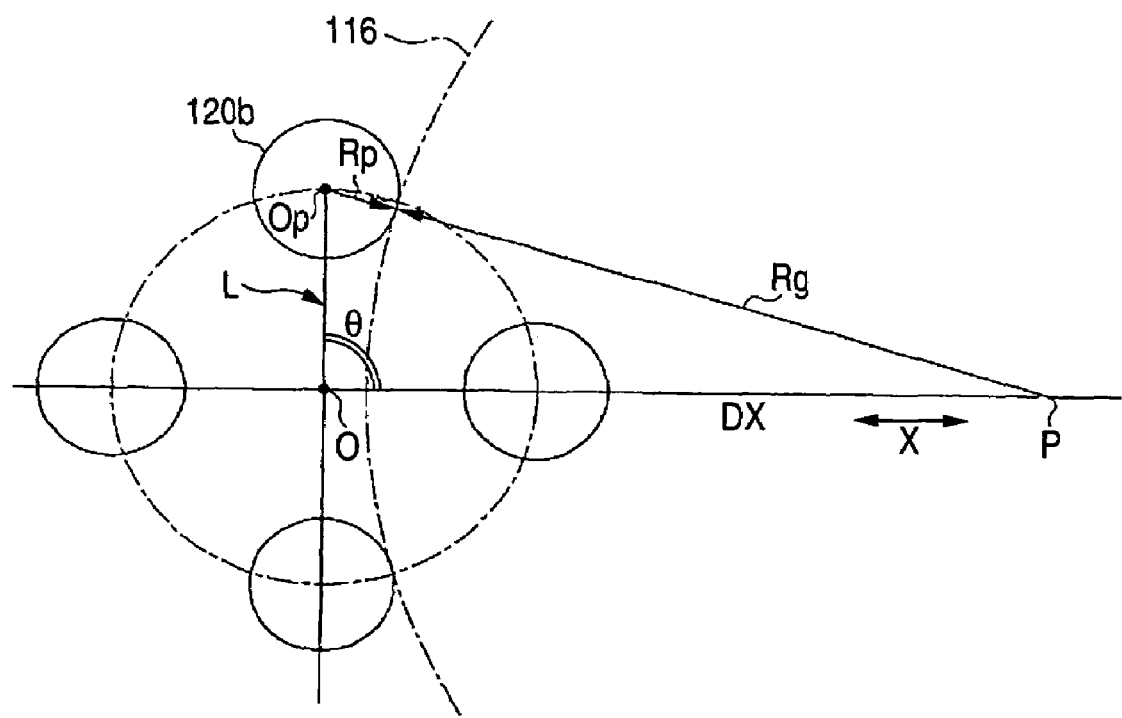
FIG. 20 is a diagram showing a grinding action of the crankshaft.

First, various factors necessary for a computing equation used in grinding of the pin part 120b will be described based on a diagram of FIG. 20.

In references, O is the center of rotation of the main spindles 104A, 104B and a journal and is also the center of revolution of the pin part 120b. P shows the center of rotation of the grindstone 116, and Op shows the center of the pin part 120b, and X shows a distance for controlling the grinding wheel stock 114 on a straight line passing both the centers O and P, respectively. This distance X is computed using a computing equation (1) of grinding wheel stock control data DX as described below and based on this data, numerical control of the linear motor 117 is performed and the grindstone 116 is moved forward and backward.

Also, L is a distance between both the centers O and Op and shows a revolution radius of the pin part 120b. Further, Rp shows a target radius at the time of finishing (grinding end) of the pin part 120b, and Rg shows a grindstone radius, and Rgp shows a distance between both the centers P and Op, respectively. This distance Rgp is equal to a value obtained by adding the finishing target radius Rp of the pin part 120b to the grindstone radius Rg.

$$Rgp=Rg+Rp$$

An actual measured radius Rpx is obtained from a diameter always measured by the dimension measuring unit 147 during grinding of the pin part 120b, but this numeral is not shown in the drawing. θ shows a revolution angle of the center Op of the pin part 120b with respect to a straight line OP for making connection between the center O of revolution of the pin part 120b and the center P of rotation of the grindstone 116.

Here, an input setting action of various data or a computing equation in the control part 142 will be described based on the various factors mentioned above.

Both the revolution radius L of the pin part 120b and the finishing target radius Rp of the pin part 120b are previously recorded on a record medium (RAM 145) as a constant rather than a measured value. The revolution angle θ of the pin part 120b is inputted from the encoders 107A, 107B of the motors 105A, 105B for main spindle to the servomotor control part 151. Since the pin part 120b is ground by the grindstone 116 while being revolved with variations in the revolving angle θ, according to the variations in the revolving angle θ, forward and backward movement of the grinding wheel stock 114 is controlled by numerical control of the linear motor 117 and the distance X between both the centers O and P for being constructed so that a surface of the grindstone 116 makes contact with a surface of the pin part 120b is controlled. In this case, a radius of the pin part 120b and a radius of the grindstone 116 are preset. A computing equation of this distance X is preset in an auxiliary storage unit (not shown) in the following manner. That is, based on each the factor of the revolution angle θ and the revolution radius L and the center distance Rgp between both the centers Op and P obtained by adding the grindstone radius Rg to the finishing target radius Rp of the pin part 120b, a distance X in a grinding finish state among the distances X, that is, a computing equation (1) of finish grinding wheel stock control data DX is set.

$$DX=L\cdot\cos\theta+\sqrt{[(Rgp)^2-L^2\cdot\sin^2\theta]} \tag{1}$$

Next, a method for grinding the pin part 120b of the crankshaft 120 using the grinding machine constructed as mentioned above will be described.

Figure 21:
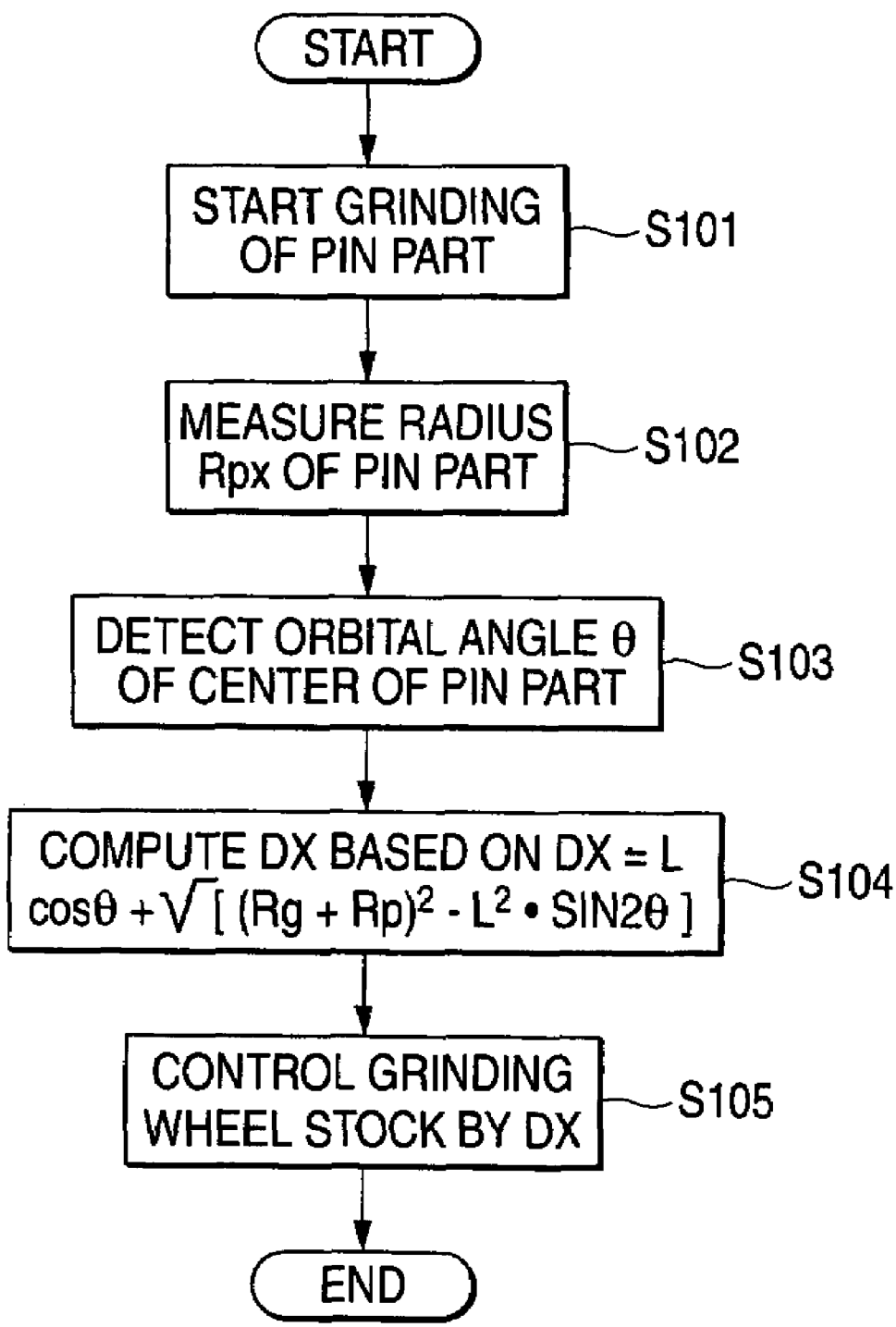
FIG. 21 is a flowchart of the grinding action of the crankshaft.

As shown in FIG. 21, when grinding of the pin part 120b is started (step S101), a radius Rpx of the pin part 120b is measured by the dimension measuring unit 147 (step 102). Also, the revolution angle θ of the pin part 120b is detected by the encoder 107 (step 103). Then, by the grinding wheel stock control data DX computed based on the computing equation (1) (step 104), a numerical control of the linear motor 117 for movement of the grinding wheel stock 114 is performed by synchronization with the main spindles 104A, 104B and the pin part 120b is ground (step 105). Following this, the grindstone 116 is moved and positioned by the motor 110 for Z axis movement so as to grind another pin part 120b.

According to the grinding machine of the embodiment described above, the following features can be obtained.

(1) In the embodiment, the journal parts 119c, 119d, 120d, 120e of the cam shaft 119 and the crank shaft 120 can be clamped by the workpiece clamping mechanisms K1, K1 of the main spindle 104A, 104B on the main spindle stocks 103A, 103B mounted in the workpiece support stock 101. Also, the rotating cam part grinding data storage part 155, the revolving pin part grinding data storage part 156 and the rotating perfect circular body grinding data storage part 157 are provided in the control part 142 of the numerical control unit 141 and any one of profile data for cam shaft grinding, crank shaft grinding program data or cylindrical grinding program data can be selected by the grinding data selection part 158. As a result of this, different kinds of cam shaft, crank shaft or cylindrical workpiece can be selectively ground by one grinding machine. In other words, it is possible to grind all of the cam part 119b of the cam shaft 119, the journal part 119a, the pin part 120b of the crankshaft 120, the journal part 120a and the cylindrical workpiece, using a single machine. Therefore, manufacture of the grinding machine is facilitated and cost can be reduced and also installation space can be reduced.

(2) In the embodiment, the workpiece rest mechanism K2 is provided. As a result of this, two journal parts 119a of the cam shaft 119 or two journal parts 120a of the crank shaft 120 can be supported and during grinding work of the cam shaft 119 or the crank shaft 120, elastic deformation of each the shaft is prevented and machining accuracy can be improved.

The embodiment can be changed and embodied in the following manner.

In the embodiment, the fixed chuck claw 122 can be replaced as shown in FIG. 15, but this fixed chuck claw 122 may also be formed in a movable chuck claw capable of being moved by the cylinder 127 and the cam member 131, etc. in a manner similar to the movable chuck claws 125. In addition, the chuck claw 125 may be replaceable according to the workpiece.

The support bodies 135 of the workpiece rest mechanism K2 may be one support body.

It may be embodied as a grinding machine of a workpiece comprising a swiveling imperfect circular body other than the cam shaft 119 or a workpiece comprising a revolving perfect circular body other than the crankshaft 120.

It may be embodied as a grinding machine of a workpiece with cylindrical shape of an imperfect circle other than the cam shaft 119 or the crank shaft 120.

What is claimed is:

1. A locking mechanism of a linear motor travel slider, wherein the travel slider is reciprocably supported on an upper surface of a bed by a linear motor, and movement of the travel slider is stopped at the time of a power failure, the locking mechanism comprising:
- a serration member laid on one of the bed and the travel slider in a direction that the travel slider travels, the serration member having a teeth portion;
- a bracket supported by the other of the bed and the travel slider;
- an actuator supported by the other of the bed and the travel slider through the bracket;
- a locking member having a teeth portion engageable with the teeth portion of the serration member, the locking member supported with respect to the actuator; and
- a controller that actuates the actuator so as to retain the lock member in an unlocked position when the linear motor is energized, and that stops an actuation of the actuator when the linear motor is in a stop state due to a power failure;
- wherein the locking member includes an urging member for making the locking member engage with the serration member while the actuation of the actuator is in a stop state;
- wherein a workpiece support mechanism for supporting a workpiece is mounted in a state opposed to the travel slider; and
- wherein a processing tool for processing the workpiece is mounted on the travel slider.

2. The locking mechanism of a linear motor travel slider as claimed in claim 1,
- wherein the serration member is disposed on a side portion of the bed;
- the bracket is disposed on a side portion of the travel slider;
- the actuator includes a cylinder that is supported by the bracket, the cylinder having a piston rod that supports the locking member; and
- the urging member includes a spring that is interposed between the locking member and the bracket.

3. The locking mechanism of a linear motor travel slider as claimed in claim 2, further comprising:
- a cover for protecting the serration member at an upper portion thereof, the cover provided one of the side portion of the travel slider and the side portion of the bed.

4. The locking mechanism of a linear motor travel slider as claimed in claim 2, further comprising:
- a holder attached to a tip end portion of the piston rod;
- wherein the locking member is attached to the tip end portion of the piston rod through the holder;
- the bracket has a rotation blocking plate; and
- the holder has a flat side that is in slidable contact with the rotation blocking plate so that a rotation of the locking member is prevented.

5. The locking mechanism of a linear motor travel slider as claimed in claim 2,
- wherein the locking member is formed in a cylindrical shape having a closed bottom and a top surface, the top surface including two portions where the teeth portion of the locking member is formed;
- the piston rod is inserted into a through hole that is formed in the closed bottom so that the locking member is movable toward an unlocked position against an urging force of the urging member; and
- the bracket has a receiving tubular part into which the locking member is slidably fitted in a whirl stop state.

6. The locking mechanism of a linear motor travel slider as claimed in claim 1, wherein the serration member is provided in correspondence with the whole region of a movement stroke of the travel slider.

7. The locking mechanism of a linear motor travel slider as claimed in claim 1, further comprising:
- a power failure detection unit is connected to the controller; and
- the controller includes:
- a workpiece processing determination unit that determines whether the workpiece is in processing in a state in which a power failure is detected,
- a travel slider retraction stop unit that retracts the travel slider and separates the processing tool from the workpiece to make a stop when the workpiece is determined to be in processing,
- a travel slider deceleration stop unit that decelerates and stops the travel slider when the workpiece is not determined to be in processing, and
- an actuator actuation stop unit that stops actuation of the actuator when the travel slider is moved in a stop position.

8. The locking mechanism of a linear motor travel slider as claimed in claim 7,
- wherein a processing machine stop instruction unit that stops a processing action of a processing machine is connected to the controller; and
- the workpiece processing determination unit is actuated in a state in which the processing action of the processing machine is stopped.

9. A locking mechanism of a linear motor travel slider, wherein the travel slider is reciprocably supported on an upper surface of a bed by a linear motor, and movement of the travel slider is stopped at the time of a power failure, the locking mechanism comprising:
- a serration member laid on one of the bed and the travel slider in a direction that the travel slider travels, the serration member having a teeth portion;
- a bracket supported by the other of the bed and the travel slider;
- an actuator supported by the other of the bed and the travel slider through the bracket;
- a locking member having a teeth portion engageable with the teeth portion of the serration member, the locking member supported with respect to the actuator; and
- a controller that actuates the actuator so as to retain the lock member in an unlocked position when the linear motor is energized, and that stops an actuation of the actuator when the linear motor is in a stop state due to a power failure;
- wherein the locking member includes an urging member for making the locking member engage with the serration member while the actuation of the actuator is in a stop state
- wherein the serration member is disposed on a side portion of the bed;
- wherein the bracket is disposed on a side portion of the travel slider;
- wherein the actuator includes a cylinder that is supported by the bracket, the cylinder having a piston rod that supports the locking member; and
- wherein the urging member includes a spring that is interposed between the locking member and the bracket.

10. The locking mechanism of a linear motor travel slider as claimed in claim 9, further comprising:
- a cover for protecting the serration member at an upper portion thereof, the cover provided one of the side portion of the travel slider and the side portion of the bed.

11. The locking mechanism of a linear motor travel slider as claimed in claim 9, further comprising:
- a holder attached to a tip end portion of the piston rod;

wherein the locking member is attached to the tip end portion of the piston rod through the holder;

the bracket has a rotation blocking plate; and the holder has a flat side that is in slidable contact with the rotation blocking plate so that a rotation of the locking member is prevented.

12. The locking mechanism of a linear motor travel slider as claimed in claim 9, wherein the locking member is formed in a cylindrical shape having a closed bottom and a top surface, the top surface including two portions where the teeth portion of the locking member is formed;

the piston rod is inserted into a through hole that is formed in the closed bottom so that the locking member is movable toward an unlocked position against an urging force of the urging member; and the bracket has a receiving tubular part into which the locking member is slidably fitted in a whirl stop state.

* * * * *